US010181774B2

(12) United States Patent
Waikar et al.

(10) Patent No.: US 10,181,774 B2
(45) Date of Patent: Jan. 15, 2019

(54) NFC ANTENNA FOR COMMUNICATING WITH A MOTOR AND METHOD OF MANUFACTURING AND USING SAME

(71) Applicant: Regal Beloit America, Inc., Beloit, WI (US)

(72) Inventors: Shailesh Prabhakar Waikar, Fort Wayne, IN (US); Kamron Mark Wright, Fort Wayne, IN (US); Ahmad Mohammad Ghannam, Toledo, OH (US); Ryan Keith Stephens, Fort Wayne, IN (US); Steven Albert Nardin, Fort Wayne, IN (US); Xiaohui Ji, Fort Wayne, IN (US); Peter Bruff Lytle, Fort Wayne, IN (US)

(73) Assignee: Regal Beloit America, Inc., Beloit, WA (US)

( * ) Notice: Subject to any disclaimer, the term of this patent is extended or adjusted under 35 U.S.C. 154(b) by 266 days.

(21) Appl. No.: 15/092,146

(22) Filed: Apr. 6, 2016

(65) Prior Publication Data

US 2017/0294825 A1 Oct. 12, 2017

(51) Int. Cl.
*H02K 11/00* (2016.01)
*H01Q 7/00* (2006.01)
(Continued)

(52) U.S. Cl.
CPC ............ *H02K 11/35* (2016.01); *H01Q 1/22* (2013.01); *H01Q 7/00* (2013.01); *H02K 11/33* (2016.01);
(Continued)

(58) Field of Classification Search
CPC ........ H02K 11/00; H02K 11/35; H02K 11/33; H02K 15/14; H01Q 1/22; H01Q 7/00;
(Continued)

(56) References Cited

U.S. PATENT DOCUMENTS

| | | | | |
|---|---|---|---|---|
| 5,726,911 A * | 3/1998 | Canada | ................ | G01R 31/343 318/434 |
| 5,917,428 A * | 6/1999 | Discenzo | ............. | G01R 31/343 307/116 |
| 6,078,874 A * | 6/2000 | Piety | ...................... | G01H 1/003 702/122 |
| 8,049,456 B2 * | 11/2011 | Shahi | ................... | G05B 19/414 318/42 |
| 9,093,934 B2 | 7/2015 | Stout et al. | | |

(Continued)

FOREIGN PATENT DOCUMENTS

| | | | | |
|---|---|---|---|---|
| GB | 2381075 A * | 4/2003 | ............. | G08C 17/06 |
| JP | 2007050999 A * | 3/2007 | ............. | H02K 15/02 |
| WO | 2008117294 A1 | 10/2008 | | |

OTHER PUBLICATIONS

Extended European Search Report for Application No. 17164522.9-1806 dated Aug. 17, 2017, 11 pages.

*Primary Examiner* — Burton Mullins
(74) *Attorney, Agent, or Firm* — Armstrong Teasdale LLP

(57) ABSTRACT

An electric motor assembly includes an electric motor, a casing configured to house the motor, and an electrical enclosure coupled to the motor casing. The electrical enclosure houses a control board including a microcontroller and a memory device therein. The microcontroller is configured to control the electric motor based at least in part on motor configuration data stored in the memory device. The assembly also includes a near field communications (NFC) antenna positioned adjacent to an opening defined in the motor casing or the electronics enclosure, and is communicatively coupled to the memory device. The NFC antenna is configured to: receive a radio signal transmitted by an external programming device, the radio signal including updated motor configuration data; convert the radio signal to an electrical signal that includes the updated motor configu- (Continued)

ration data; and transmit the electrical signal to the memory device to store the updated motor configuration data.

32 Claims, 15 Drawing Sheets

(51) Int. Cl.
| | |
|---|---|
| *H04B 5/00* | (2006.01) |
| *H01Q 1/22* | (2006.01) |
| *H02K 11/35* | (2016.01) |
| *H02K 11/33* | (2016.01) |
| *H02K 15/14* | (2006.01) |
| *H02P 31/00* | (2006.01) |

(52) U.S. Cl.
CPC ............. *H02K 15/14* (2013.01); *H02P 31/00* (2013.01); *H04B 5/0031* (2013.01); *H04B 5/0062* (2013.01)

(58) Field of Classification Search
CPC .. H04B 5/0025; H04B 5/0031; H04B 5/0081; H02P 1/00
USPC ...................................................... 310/68 R
See application file for complete search history.

(56) References Cited

U.S. PATENT DOCUMENTS

| | | | |
|---|---|---|---|
| 2007/0194945 A1* | 8/2007 | Atkinson | G08C 17/02 340/13.26 |
| 2010/0117454 A1* | 5/2010 | Cook | G06K 7/0008 307/104 |
| 2011/0260671 A1 | 10/2011 | Jeung | |
| 2012/0268335 A1 | 10/2012 | Zhang et al. | |
| 2014/0079564 A1 | 3/2014 | Becerra et al. | |
| 2014/0188076 A1 | 7/2014 | Kamen et al. | |
| 2014/0265981 A1 | 9/2014 | Stout et al. | |
| 2014/0265985 A1 | 9/2014 | Bonner, Jr. et al. | |
| 2015/0120062 A1* | 4/2015 | McKinzie | G05B 15/02 700/275 |
| 2015/0349612 A1* | 12/2015 | Ito | G01K 1/024 310/68 B |

* cited by examiner

| Diagnostics | |
|---|---:|
| Time powered | 00:47:40 |
| Time run | 00:00:04 |
| Time over 80% power | 00:00 |
| Time in sp. cutback region | 00:00 |
| Time in temp. cutback region | 00:00 |
| Good starts | 9 |
| Failed starts | 1 |
| Resets | 6 |
| Stalls | 2 |
| No. of bad serial packets received | 0 |
| Watchdog shutdown events | 0 |
| Time run in certain demand ranges | 0 |
| Thermal shock events | 0 |
| Power Module temperature | 23.1 |
| Bus voltage | 360.4 |
| Open-phase events | 0 |
| UL lockouts | 0 |
| Reverse start attempts | 0 |
| Shaft watts | 0 |
| Torque | 0 |

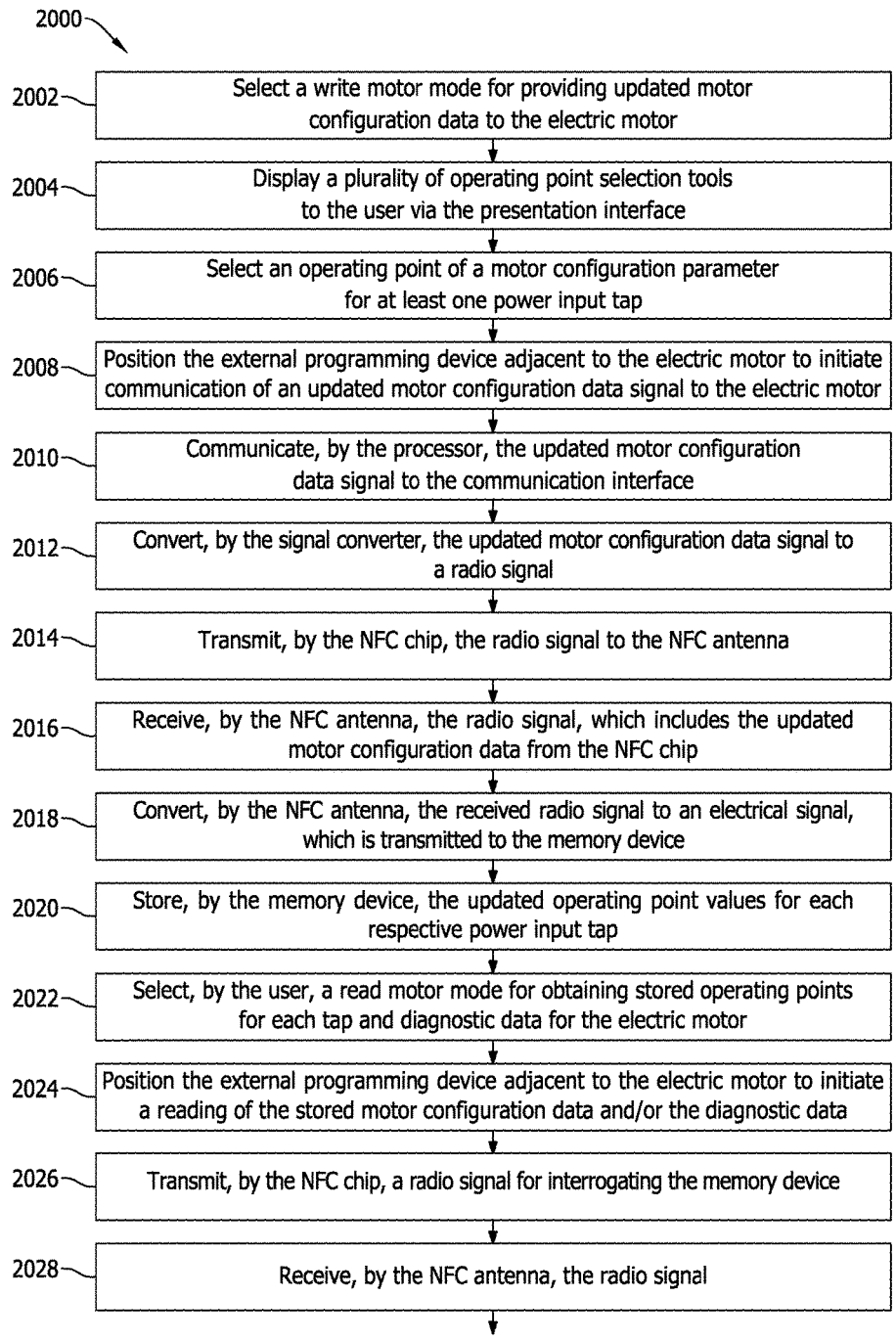

NFC ANTENNA FOR COMMUNICATING WITH A MOTOR AND METHOD OF MANUFACTURING AND USING SAME

BACKGROUND

The field of the invention relates generally to electric motors, and more particularly, to electric motors having near field communication (NFC) antennas for relaying signals to and from electronic controls.

One of many applications for an electric motor is to operate a pump or a blower. The electric motor may be configured to rotate an impeller within a pump or blower to displace fluid. Many gas burning appliances include an electric motor, for example, without limitation, water heaters, boilers, pool heaters, space heaters, furnaces, and radiant heaters. In some examples, the electric motor powers a blower that moves air or a fuel/air mixture through the appliance. In other examples, the electric motor powers a blower that distributes air output from the appliance. Typically, these electric motors are enclosed within a motor casing to protect the motor from the environment and protect people from dangerous components of the motor.

One type of motor used in such systems is an alternating current (AC) induction motor. Another type of motor that may be used in the application described above is an electronically commutated motor (ECM). ECMs include, but are not limited to, brushless direct current (BLDC) motors, permanent magnet alternating current (PMAC) motors, and variable reluctance motors. Typically, these motors provide higher electrical efficiency than an AC induction motor. Some ECMs have an axial flux configuration in which the flux in the air gap extends in a direction parallel to the axis of rotation of the rotor.

Some known electric motors require electronic controls. These electronic controls are often enclosed inside the motor casing to protect the electronic controls from the environment. Some of these electronic controls incorporate radio-based communication capabilities, such as Radio Frequency Identification (RFID), Wireless Local Area Network (WLAN), and Wireless Personal Area Network (WPAN) capabilities, for communicating with handheld devices. One type of radio-based communication system is a Near Field Communication (NFC) system. Generally, an NFC system requires at least two inductive components that generate magnetic fields. When the components' magnetic fields overlap, the components will inductively transfer their currents and, thereby, exchange signals as well as power for operating a device the system is communicating with.

Some known radio-based communications systems have a limited range. For example, NFC components' magnetic fields generally have a very limited range, usually no more than 10 centimeters. However, electronic controls are typically positioned in the motor casing such that the antenna signal from the antenna incorporated in the electronic controls would not reach the exterior of the casing. Additionally, the typical metal enclosure interferes with the signal. Therefore, a user has to position a handheld device inside the casing to transmit the signal to and receive a signal from an antenna, such as an NFC antenna, on a typical motor, which is both awkward and dangerous for the user. Additionally, such antennas are difficult to repair or replace since they are inside the motor assembly. Furthermore, it is expensive to retrofit a motor to add radio-based communication capabilities.

BRIEF DESCRIPTION

In one aspect, an electric motor assembly includes an electric motor, a motor casing configured to house the electric motor, and an electrical enclosure coupled to the motor casing. The electrical enclosure is configured to house a control board including a microcontroller and a memory device therein. The microcontroller is configured to control the electric motor based at least in part on motor configuration data stored in the memory device. The assembly also includes a near field communications (NFC) antenna positioned adjacent an opening defined in the motor casing or the electronics enclosure, and is communicatively coupled to the memory device. The NFC antenna is configured to: receive a radio signal transmitted by an external programming device, the radio signal including updated motor configuration data; convert the radio signal to an electrical signal that includes the updated motor configuration data; and transmit the electrical signal to the memory device to store the updated motor configuration data.

In another aspect, a method of manufacturing an electric motor is provided. The method includes providing a motor casing for housing mechanical components of the electric motor, and coupling a control board within an electrical enclosure. The control board includes a microcontroller and a memory device. The method also includes forming an opening in the motor casing or the electrical enclosure, and providing an NFC antenna adjacent to the opening. The NFC antenna is in communication with the memory device. The method further includes coupling an antenna cover within the opening, the antenna cover manufactured using a non-conductive material that enables NFC communication therethrough, and coupling the motor casing to the electrical enclosure.

In yet another aspect, a method of communicating between an electric motor and an external programming device using NFC is provided. The electric motor includes a motor casing configured to house the electric motor and an electronics enclosure coupled to the motor casing and configured to house a control board that includes a microcontroller and a memory device. The method includes receiving, by an NFC antenna coupled to an interior of the electric motor, a radio signal transmitted by the external programming device. The radio signal includes updated motor configuration data, wherein the NFC antenna is positioned adjacent to an opening defined in one of the motor casing and the electronics enclosure, and is communicatively coupled to the memory device. The method also includes converting, by the NFC antenna, the radio signal to an electrical signal that includes the updated motor configuration data. The method further includes transmitting, by the NFC antenna, the electrical signal to the memory device, and storing, by the memory device, the updated motor configuration data based on the electrical signal received from the NFC antenna.

In yet another aspect, an electric motor communication system is provided that includes an electric motor and an external programming device. The electric motor includes a motor casing configured to house the electric motor, and an electrical enclosure coupled to the motor casing. The electrical enclosure is configured to house a control board including a microcontroller and a memory device therein. The microcontroller is configured to control the electric motor based at least in part on motor configuration data stored in the memory device. The assembly also includes a near field communications (NFC) antenna positioned adjacent to an opening defined in the motor casing or the electronics enclosure, and is communicatively coupled to the memory device. The external programming device comprising a processor, a memory device, and an NFC chip configured to transmit a radio signal to the NFC antenna.

BRIEF DESCRIPTION OF THE DRAWINGS

FIG. 6 is a screenshot of exemplary diagnostics data displayed to the user retrieved using the read motor mode as shown in FIG. 5.

DETAILED DESCRIPTION

Figure 1:
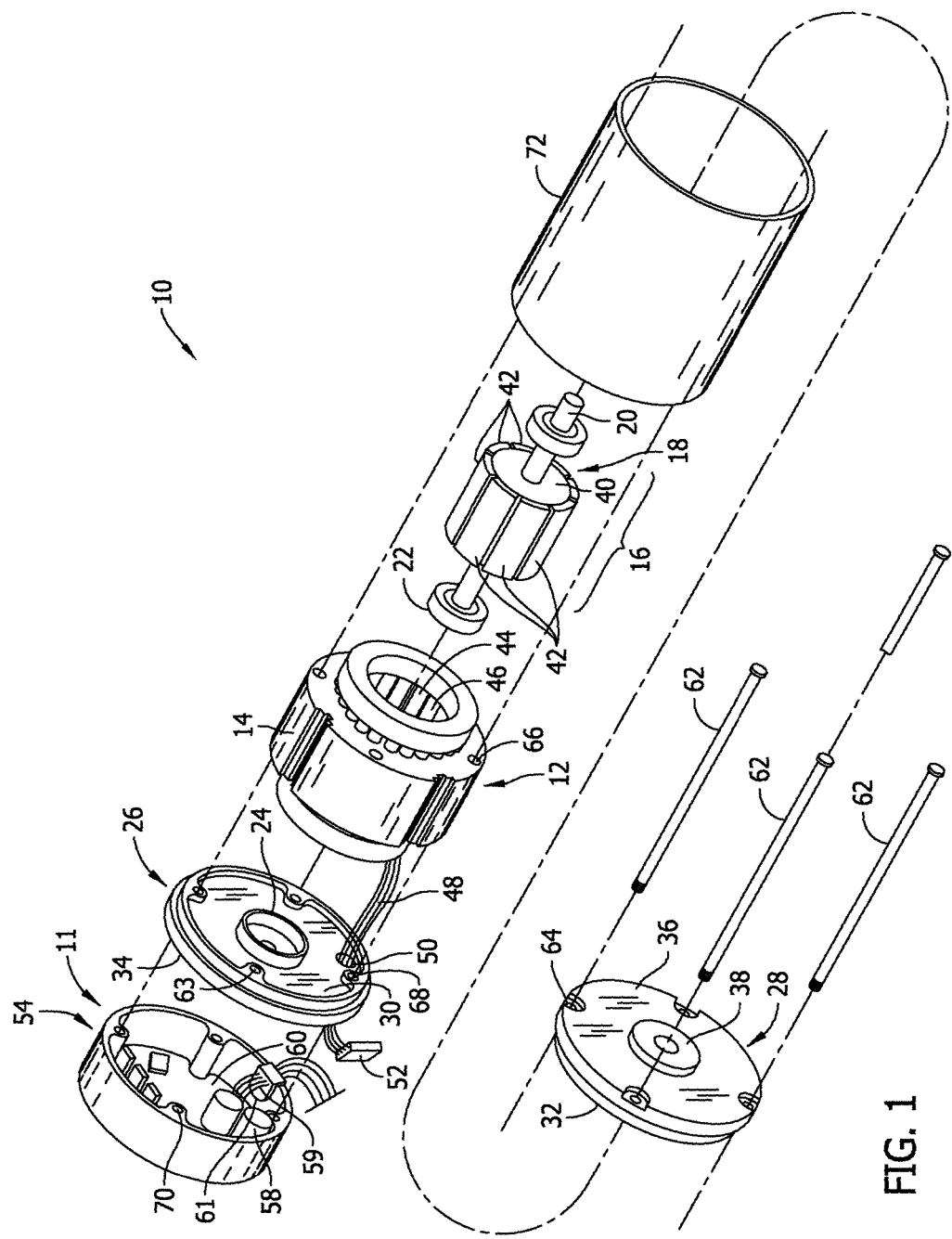
FIG. 1 is an exploded view of an exemplary electric motor.

FIG. 1 is an exploded view of an exemplary electric motor 10. Motor 10 includes control system 11, a stationary assembly 12 including a stator or core 14, and a rotatable assembly 16 including a permanent magnet rotor 18 and a shaft 20. In the exemplary embodiment, motor 10 is utilized as a fan and/or blower motor in a fluid (e.g., water, air, etc.) moving system. For example, electric motor 10 may be utilized in a clean room filtering system, a fan filter unit, a variable air volume system, a refrigeration system, a furnace system, an air conditioning system, and/or a residential or commercial heating, ventilation, and air conditioning (HVAC) system. Alternatively, motor 10 may be implemented in any application that enables motor 10 to function as described herein. Motor 10 may also be used to drive mechanical components other than a fan and/or blower, including mixers, gears, conveyors, and/or treadmills. In the exemplary embodiment, control system 11 is integrated with motor 10. Alternatively, motor 10 may be external to and/or separate from control system 11.

Rotor 18 is mounted on and keyed to shaft 20 journaled for rotation in conventional bearings 22. Bearings 22 are mounted in bearing supports 24 integral with a first end member 26 and a second end member 28. End members 26 and 28 have inner facing sides 30 and 32 between which stationary assembly 12 and rotatable assembly 16 are located. Each end member 26 and 28 has an outer side 34 and 36 opposite its inner side 30 and 32. Additionally, second end member 28 has an aperture 38 for shaft 20 to extend through outer side 34.

Rotor 18 comprises a ferromagnetic core 40 and is rotatable within stator 14. Segments 42 of permanent magnet material, each providing a relatively constant flux field, are secured, for example, by adhesive bonding to rotor core 40. Segments 42 are magnetized to be polarized radially in relation to rotor core 40 with adjacent segments 42 being alternately polarized as indicated. While magnets on rotor 18 are illustrated for purposes of disclosure, it is contemplated that other rotors having different constructions and other magnets different in both number, construction, and flux fields may be utilized with such other rotors within the scope of the invention.

Stationary assembly 12 comprises a plurality of winding stages 44 adapted to be electrically energized to generate an electromagnetic field. Stages 44 are coils of wire wound around teeth 46 of laminated stator core 14. Winding terminal leads 48 are brought out through an aperture 50 in first end member 26 terminating in a motor connector 52. While stationary assembly 12 is illustrated for purposes of disclosure, it is contemplated that other stationary assemblies of various other constructions having different shapes and with different number of teeth may be utilized within the scope of the invention.

Motor 10 further includes an electrical enclosure 54 which mounts on the rear portion of motor 10. Electrical enclosure 54 houses control system 11, which includes a plurality of electronic components 58 and input taps 59 mounted on a control board, such as a printed circuit board (PCB) 60. Control system 11 is connected to winding stages 44 by interconnecting motor connector 52. Control system 11 applies a voltage to one or more of winding stages 44 at a time for commutating winding stages 44 in a preselected sequence to rotate rotatable assembly 16 about an axis of rotation. In an alternative embodiment, control system 11 is remotely positioned from and communicatively coupled to motor 10. In another alternative embodiment, control system 11 is a central control system for more than one electric motor (e.g., in an HVAC system), and is communicatively coupled to motor 10.

Electrical enclosure 54 further includes a Near Field Communication (NFC) antenna 61 having a wound or looped wire configured to transmit radio signals when current flow is induced through the looped wire. However, in alternative embodiments, NFC antenna 61 may be any type of NFC antenna, including a "component" antenna that is packaged by a manufacturer, an "inductor" type antenna (e.g., a manufactured inductor of the correct value to resonate with the NFC memory chip), and/or any other type of known antenna that enables NFC communication as described herein. In alternative embodiments, antenna 61 is any size, shape, and configuration suitable for functioning as described herein. For example, NFC antenna 61 may be any tuned circuit configured to receive radio signals in any radio-based communication system including, but not limited to, Radio Frequency Identification (RFID), Wireless Local Area Network (WLAN), and Wireless Personal Area Network (WPAN) systems. In the exemplary embodiment, NFC antenna 61 generates a magnetic field when it vibrates at a selected frequency. Specifically, NFC antenna 61 vibrates at a frequency of about 13.56 MHz and, thus, is suitable for use in a Near Field Communication (NFC) system. In alternative embodiments, NFC antenna 61 may vibrate at any frequency.

In the exemplary embodiment, an NFC interrogation device transmits a radio frequency signal that contains power and data, which is sensed by the NFC component to which NFC antenna 61 is coupled. Because of the close proximity of the NFC interrogation device and the NFC component, only the magnetic component of the radio wave is used. The NFC component modulates the magnetic field by adjusting loading characteristics. The NFC interrogation device senses the adjustments in loading and computes the data from the NFC component. Therefore, the magnetic field generated by NFC antenna 61 defines the antenna range of NFC antenna 61. In the exemplary embodiment, NFC antenna 61 has an antenna range of approximately 10 centimeters. Additionally, in the exemplary embodiment, NFC antenna 61 receives radio signals from NFC interrogation devices when NFC antenna 61 is positioned within the magnetic field of the NFC interrogation devices. The NFC interrogation devices' magnetic fields generally have a very limited range, usually no more than 10 centimeters.

In the exemplary embodiment, NFC antenna 61 is positioned adjacent an opening defined in electrical enclosure 54 and/or a casing 72 of motor 10, and is communicatively coupled to a memory device (not shown) on PCB 60 such that a user can position a hand held device, e.g. a mobile computing device, within the antenna range. Ideally, NFC antenna 61 is positioned such that the antenna range extends outside electrical enclosure 54. In alternative embodiments, antenna 61 is positioned anywhere interior or exterior of electrical enclosure 54.

Connecting elements 62 include a plurality of bolts that pass through bolt holes 64 in second end member 28, bolt holes 66 in core 14, bolt holes 68 in first end member 26, and bolt holes 70 in enclosure 44. Connecting elements 62 are adapted to urge second end member 28 and enclosure 44 toward each other thereby supporting first end member 26, stationary assembly 12, and rotatable assembly 16 therebetween. Additionally, a casing 72 is positioned between first end member 26 and second end member 28 to facilitate enclosing and protecting stationary assembly 12 and rotatable assembly 16.

Motor 10 may include any even number of rotor poles and the number of stator poles are a multiple of the number of rotor poles. For example, the number of stator poles may be based on the number of phases. In one embodiment (not shown), a three-phase motor 10 includes six rotor pole pairs and stator poles.

Figure 2:
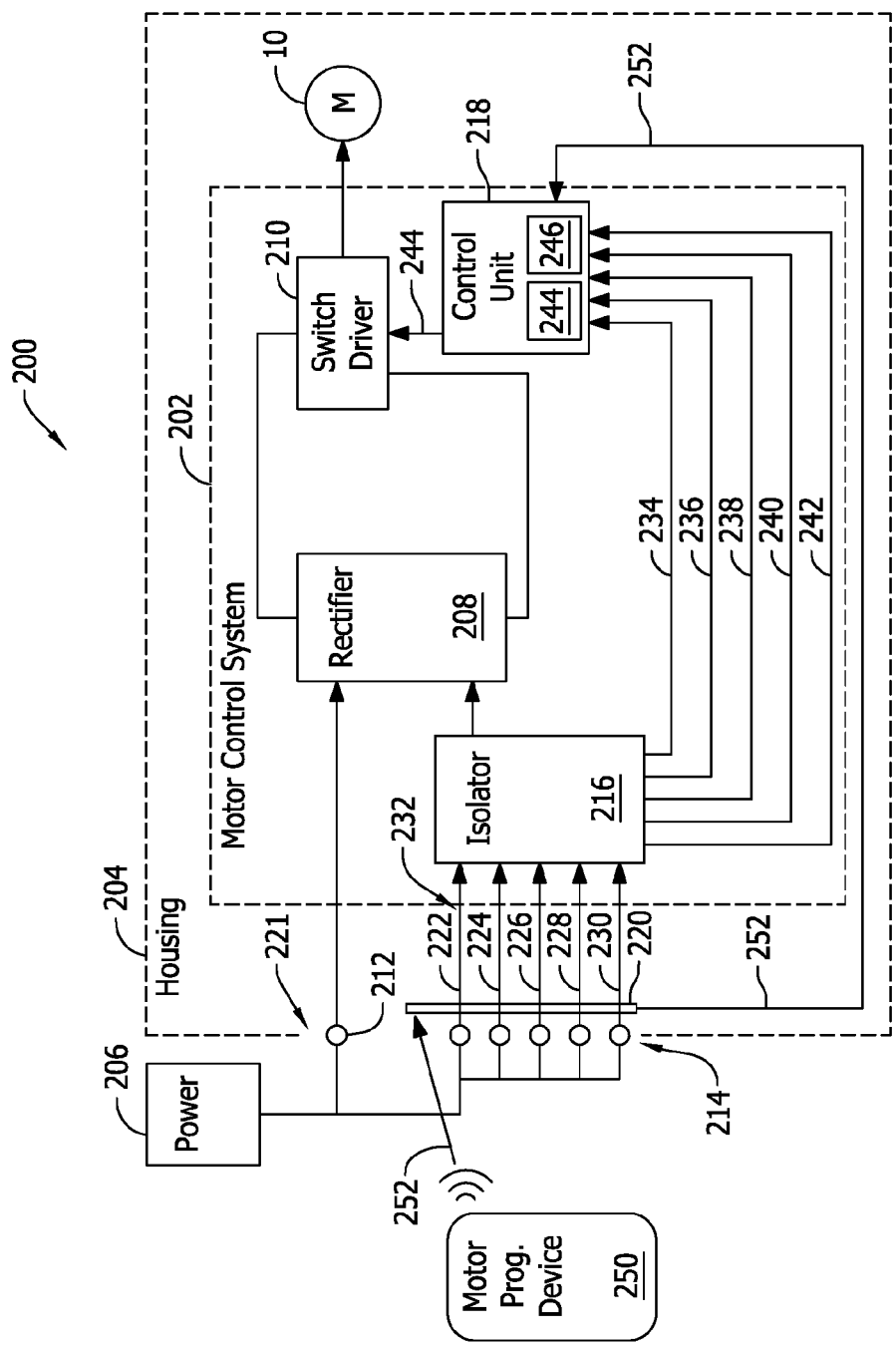
FIG. 2 is a block diagram of an exemplary NFC motor communication system.

FIG. 2 is a block diagram of an NFC motor communication system 200. NFC motor communication system 200 includes a motor control system 202 that may be used for operating a motor 10 (shown in FIG. 1) and a motor programming device 250 for communicating with motor control system 202. Motor control system 202 may be similar to control system 11 (shown in FIG. 1). In the exemplary embodiment, motor control system 202 is coupled to motor 10, which together are enclosed by electrical enclosure 54 and a casing 204. Motor control system 202 receives power from a power source 206 that is configured to transmit AC power/signals such as, but not limited to, high and/or low voltages.

In the exemplary embodiment, motor control system 202 includes a rectifier 208, a switch driver 210, a power terminal 212 coupled to power source 206, a plurality of input taps 214, an isolator 216, a control unit 218, and an antenna 220. More specifically, power terminal 212 is coupled to power source 206 to receive input power and provide the input power to rectifier 208. In the exemplary embodiment, power source 206 supplies a single-phase alternating current (AC) voltage (for example, between about 100 V and about 250 V) to motor control system 202. Rectifier 208 receives the input power via power terminal 212, and rectifies the input power to produce a pulsed DC voltage. Switch driver 210 conditions the pulsed DC voltage for driving motor 10, which uses the power to drive the load. In the exemplary embodiment, switch driver 210 converts the pulsed DC voltage to a three-phase AC voltage. Alternatively, switch driver 210 converts the pulsed DC voltage to any type of voltage that enables motor control system 202 to function as described herein.

Input taps 214, which may be input taps 59 (shown in FIG. 1), extend from motor control system 202 via an opening 221 defined in casing 204. In the exemplary embodiment, input taps 214 include a first input tap 222, a second input tap 224, a third input tap 226, a fourth input tap 228, and a fifth input tap 230. In one embodiment, first tap 222 may represent a first cooling speed, second tap 224 may represent a second cooling speed, third tap 226 may represent a first heating speed, fourth tap 228 may represent a second heating speed, and fifth tap 230 may represent a fan operation. While speed is used as the operating parameter in the present embodiment, the operating parameter may be any other controllable parameter such as torque or airflow. Alternatively, the plurality of input taps 214 may include any number of input taps 214 to enable motor 10 to function as described herein including, for example, three taps associated with a cooling speed, a heating speed, and a fan speed, or ten taps for providing multiple speeds associated with cooling, heating, and fan operation.

Isolator 216 is coupled to input taps 214, rectifier 208, and control unit 218. Isolator 216 includes a transformer (not shown) and a current detecting circuit or a comparator circuit (not shown) associated with each of the plurality of input taps 214. One or more of the transformers may be in the form of a current transformer, which can be used to measure current. For at least one of taps 232 that is activated, its associated comparator circuit outputs a logic level signal (e.g., a logic "1" or "high") to control unit 218 via lines 234, 236, 238, 240, and 242, respectively.

In the exemplary embodiment, control unit 218 includes at least one memory device 244 and a processor 246 that is communicatively coupled to memory device 244 for executing instructions. In some embodiments, executable instructions are stored in memory device 244. In the exemplary embodiment, control unit 218 performs one or more operations described herein by programming processor 246. For example, processor 246 may be programmed by encoding an operation as one or more executable instructions and by providing the executable instructions in memory device 244.

Processor 246 may include one or more processing units (e.g., in a multi-core configuration). Further, processor 246 may be implemented using one or more heterogeneous processor systems in which a main processor is present with secondary processors on a single chip. As another illustrative example, processor 246 may be a symmetric multi-processor system containing multiple processors of the same type. Further, processor 246 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 246 controls operation of control unit 218.

In the exemplary embodiment, memory device 244 is one or more devices that enable information such as executable instructions and/or other data to be stored and retrieved. Memory device 244 may include one or more computer readable media, such as, without limitation, an NFC electrically erasable programmable read-only memory (EEPROM), a standard EEPROM, dynamic random access memory (DRAM), static random access memory (SRAM), a solid state disk, and/or a hard disk. Memory device 244 may be configured to store, without limitation, application source code, application object code, source code portions of interest, object code portions of interest, configuration data, execution events and/or any other type of data. In the exemplary embodiment, memory device 244 includes firmware and/or initial motor configuration data for control unit 218. Moreover, in the exemplary embodiment, memory device 244 stores diagnostic data associated with operation of motor 10, for transmission to one or more external devices upon request. Diagnostic data includes, but is not limited to including, time powered, time run, time run above 80% demand, time in speed cutback region, time in temperature cutback region, good starts, failed starts, resets, stalls, number of bad serial packets received, watchdog shutdown events, time run in certain demand ranges, thermal shock events, power module temperature, bus voltage, open-phase events, UL lockouts, reverse start attempts, shaft watts, and torque.

Processor 246 is configured to determine which at least one input tap 232 of the plurality of input taps 214 is activated by input voltage from power source 206 based on the detection by isolator 216. More specifically, processor 246 receives the logic level signals transferred from isolator 216 through lines 236-242. In response to the received logic level signals, processor 246 accesses memory device 244 and retrieves a predefined operating point associated with the activated tap 232. Processor 246 then generates a PWM signal 244 representing the predefined operating characteristic, and outputs the PWM signal 244 to switch driver 210 for driving power switches to output the appropriate power to drive motor 10 at the desired operating point.

In the exemplary embodiment, antenna 220 is coupled adjacent to opening 221 defined in casing 204 or electrical enclosure 54. Antenna 220 enables NFC communication between a user of motor 10 (i.e., a manufacturer of motor 10, an HVAC system manufacturer using motor 10, a technician of motor 10, and/or a customer owning motor 10) with control unit 218 to define, change, or override the operating parameters associated with taps 214. Casing 204 is manufactured using metal, which may interfere with an updated motor configuration signal 252 being transmitted to control unit 218, so positioning antenna 220 adjacent to opening 221 enables the updated motor configuration data signal 252 to be received by antenna 220 and transmitted to control unit 218. Using motor programming device 250, the user communicates updated motor configuration data 252 to control unit 218 via antenna 220. The updated motor configuration data includes predefined operating points associated with one or more motor taps 214, as described in greater detail herein.

Figure 3:
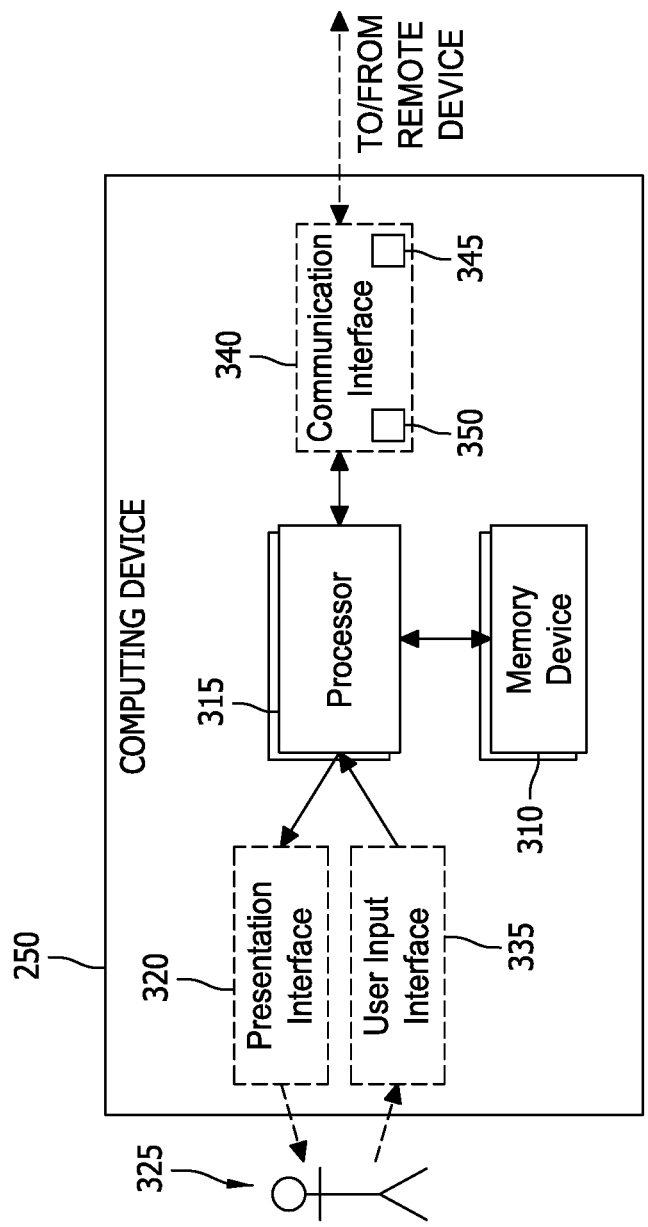
FIG. 3 is a block diagram of a motor programming device that may be used with the NFC motor communication system shown in FIG. 2.

FIG. 3 is a block diagram of motor programming device 250 that may be used with NFC motor communication system 200 (shown in FIG. 2). Motor programming device 250 includes at least one memory device 310 and a processor 315 that is coupled to memory device 310 for executing instructions. In some embodiments, executable instructions are stored in memory device 310. In the exemplary embodiment, motor programming device 250 performs one or more operations described herein by programming processor 315. For example, processor 315 may be programmed by encoding an operation as one or more executable instructions and by providing the executable instructions in memory device 310.

Processor 315 may include one or more processing units (e.g., in a multi-core configuration). Further, processor 315 may be implemented using one or more heterogeneous processor systems in which a main processor is present with secondary processors on a single chip. As another illustrative example, processor 315 may be a symmetric multi-processor system containing multiple processors of the same type. Further, processor 315 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 315 controls operation of motor 10 (shown in FIG. 1).

In the exemplary embodiment, memory device 310 is one or more devices that enable information such as executable instructions and/or other data to be stored and retrieved. Memory device 310 may include one or more computer readable media, such as, without limitation, dynamic random access memory (DRAM), static random access memory (SRAM), a solid state disk, and/or a hard disk. Memory device 310 may be configured to store, without limitation, application source code, application object code, source code portions of interest, object code portions of interest, configuration data, execution events and/or any other type of data. In the exemplary embodiment, memory device 310 includes firmware and/or initial configuration data for motor 10.

In the exemplary embodiment, motor programming device 250 includes a presentation interface 320 that is coupled to processor 315. Presentation interface 320 presents information, such as application source code and/or execution events, to a user 325. For example, presentation interface 320 may include a display adapter (not shown) that may be coupled to a display device, such as a cathode ray tube (CRT), a liquid crystal display (LCD), an organic LED (OLED) display, and/or an "electronic ink" display. In some embodiments, presentation interface 320 includes one or more display devices.

In the exemplary embodiment, motor programming device 250 includes a user input interface 335 that is coupled to processor 315 and receives input from user 325. User input interface 335 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 320 and user input interface 335.

Motor programming device 250 includes a communication interface 340 coupled to processor 315. Communication interface 340 communicates with one or more remote devices, such as antenna 220 (shown in FIG. 2). In the exemplary embodiment, communication interface 340 includes a near field communications (NFC) chip 345 that enables NFC communication and a signal converter 350 that converts NFC signals received by NFC chip 345. For example, in one embodiment, signal converter 350 converts a motor configuration data signal into a radio signal for transmission to antenna 220. In another embodiment, signal converter 350 coverts a received radio signal into motor diagnostic data for analyzing operations of motor 10.

Motor programming device 250 may include more or less components than those specifically shown in FIG. 3. For example, in at least some embodiments, motor programming device 250 does not include presentation interface 320 and user input interface 335.

Figure 4:
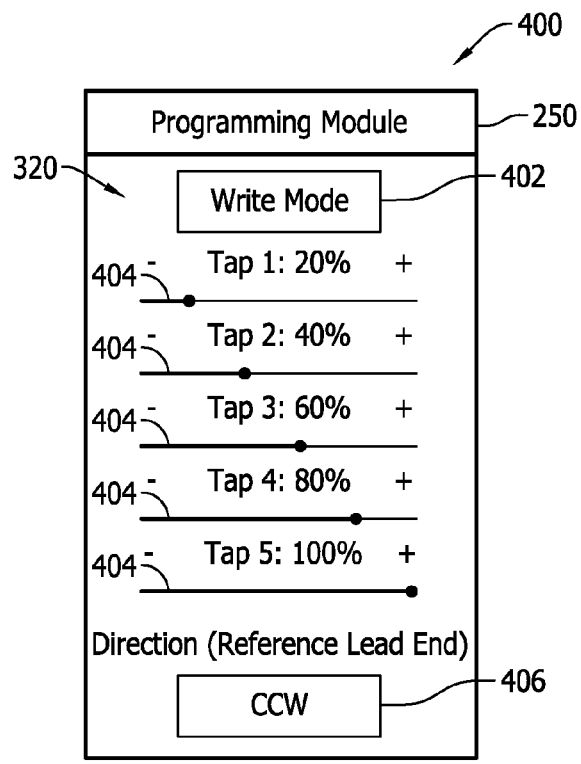
FIG. 4 is a screenshot of the motor programming device shown in FIGS. 2 and 3 in a write motor mode.

FIG. 4 is a screenshot 400 of motor programming device 250 (shown in FIGS. 2 and 3) in a write motor mode. In the exemplary embodiment, presentation interface 320 displays a menu 402 that includes options available to the user for communicating with electric motor 10. Upon the write motor mode being selected by the user using user input interface 335, an operating point selection tool 404 is displayed for each power input tap 222-230 (shown in FIG. 2). The user adjusts one or more of operating point selection tools 404 to a desired operating point value for each power input tap 222-230 for operating motor 10. In the exemplary embodiment, presentation interface 320 may also display a direction reference selection tool 406 for enabling the user to select a clockwise option CW or a counter-clockwise CCW option as a reference direction. When the desired operating point values have been selected, the user positions motor programming device 250 near NFC antenna 220 (shown in FIG. 2) to communicate the updated motor configuration data signal to motor 10.

Figure 5:
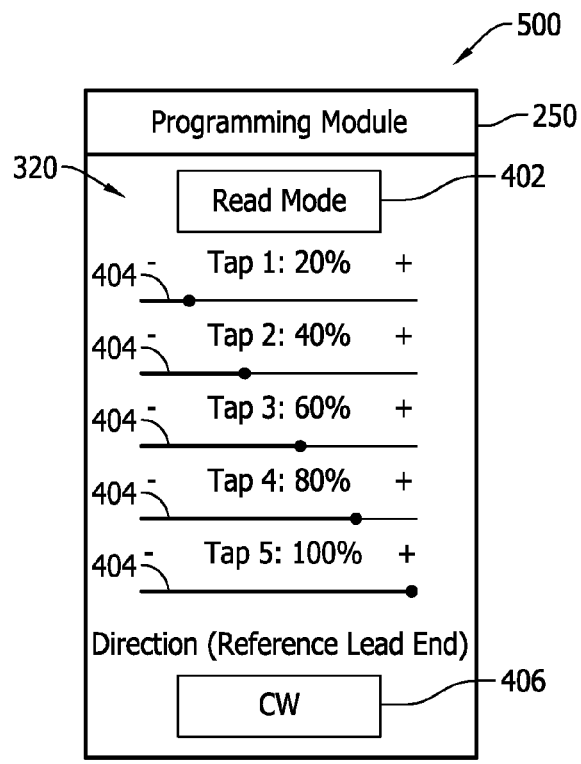
FIG. 5 is a screenshot of the motor programming device shown in FIGS. 2 and 3 in a read motor mode.

FIG. 5 is a screenshot of motor programming device 250 (shown in FIGS. 2 and 3) in a read motor mode. FIG. 6 is a screenshot 600 of the diagnostics data displayed to the user retrieved using the read motor mode (shown in FIG. 5). In the exemplary embodiment, when the user selects the read mode from menu 402 and positions motor programming device 250 near NFC antenna 220 (shown in FIG. 2), presentation interface 320 is configured to display stored motor configuration data and diagnostic data from motor 10.

More specifically, motor programming device 250 receives the operating point values for each power input tap 222-230 that are stored in memory device 244 and displays them on operating point selection tools 404. This enables the user to easily view the current operating points for each power input tap 222-230 and to adjust them if desired.

To view the diagnostic data, the user selects "Diagnostics" from menu 404. Diagnostic data stored by memory device 244 and available to the user includes, but is not limited to including, time powered, time run, time run above 80% demand, time in speed cutback region, time in temperature cutback region, good starts, failed starts, resets, stalls, number of bad serial packets received, watchdog shutdown events, time run in certain demand ranges, thermal shock events, power module temperature, bus voltage, open-phase events, UL lockouts, reverse start attempts, shaft watts, and torque.

In some embodiments, processor 315 analyzes the diagnostic data based on rules stored in memory device 310. For example, in one embodiment, processor 315 compares one or more diagnostic datum to predefined threshold values. In another embodiment, processor 315 determines whether one or more diagnostic datum has exceeded a predetermined count value for number of occurrences. When the predefined threshold values and/or the count value have been exceeded, processor 315 generates and alert and/or warning and presents it to user 325 via presentation interface 320.

Figure 7:
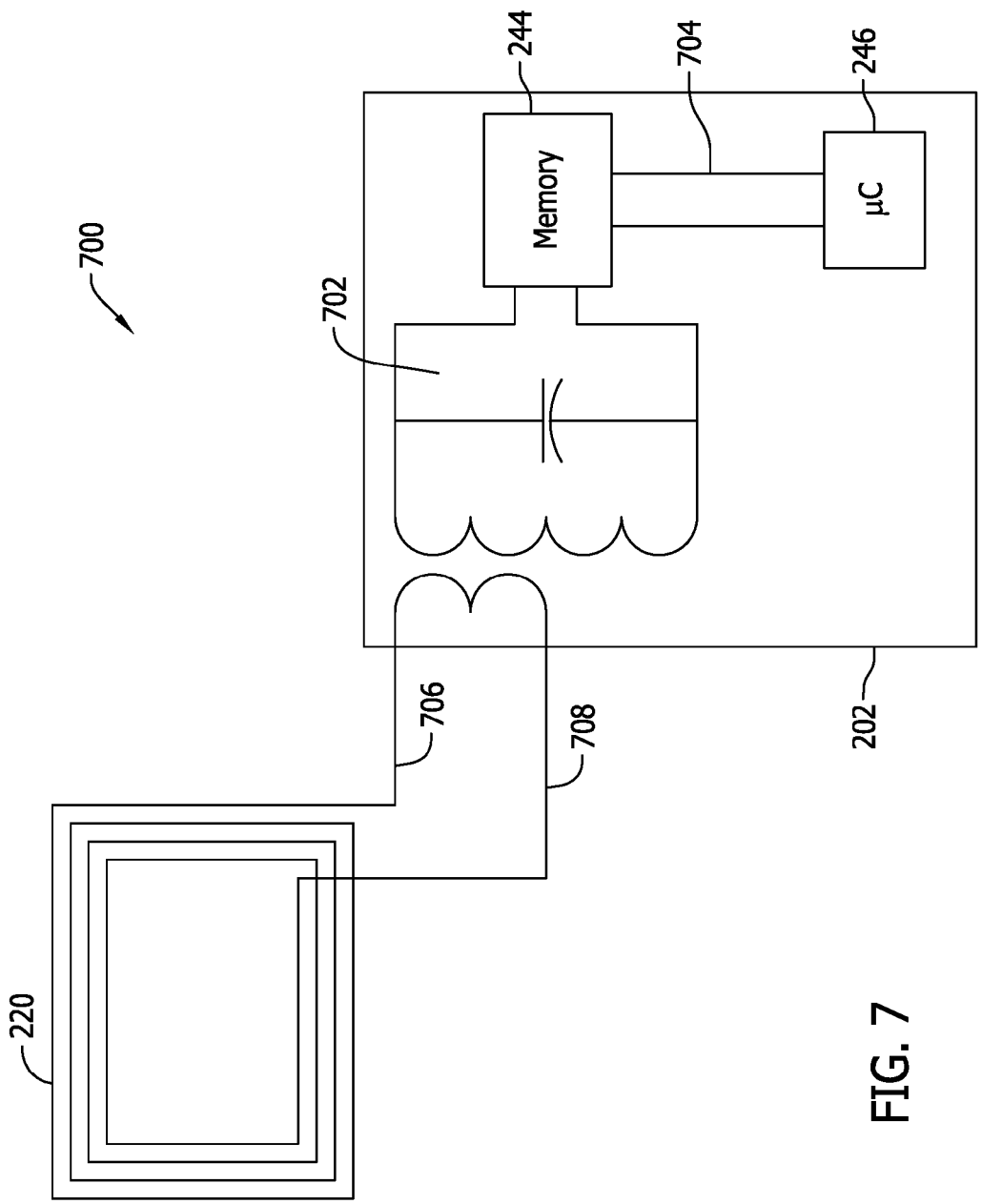
FIG. 7 is a schematic diagram showing a connection of the antenna shown in FIG. 2 to the motor control system shown in FIG. 2.

FIG. 7 is a schematic diagram 700 showing a connection of antenna 220 (shown in FIG. 2) to motor control system 202 (shown in FIG. 2). In the exemplary embodiment, motor control system 202 includes memory device 244 (shown in FIG. 2), an NFC tuned circuit 702, and a microcontroller 246. In alternative embodiments, any antenna suitable for functioning as described herein may be swapped for NFC tuned circuit 702. In the exemplary embodiment, memory device 244 is an NFC electrically erasable programmable read-only memory (EEPROM). An inter-integrated circuit (I2C) 704 is provided for coupling memory device 244 to microcontroller 246. In an alternative embodiment, a standard EEPROM (not shown), without NFC capabilities, is swapped for NFC EEPROM memory device 244. In the exemplary embodiment, a first line 706 and a second line 708 couple antenna 220 to NFC tuned circuit 702. In an alternative embodiment, NFC antenna 220 is coupled directly to memory device 244 or via a coupling link or transmission line.

a coupling link or a transmission line may be provided to couple antenna 220 to NFC tuned circuit 702.

Figure 8:
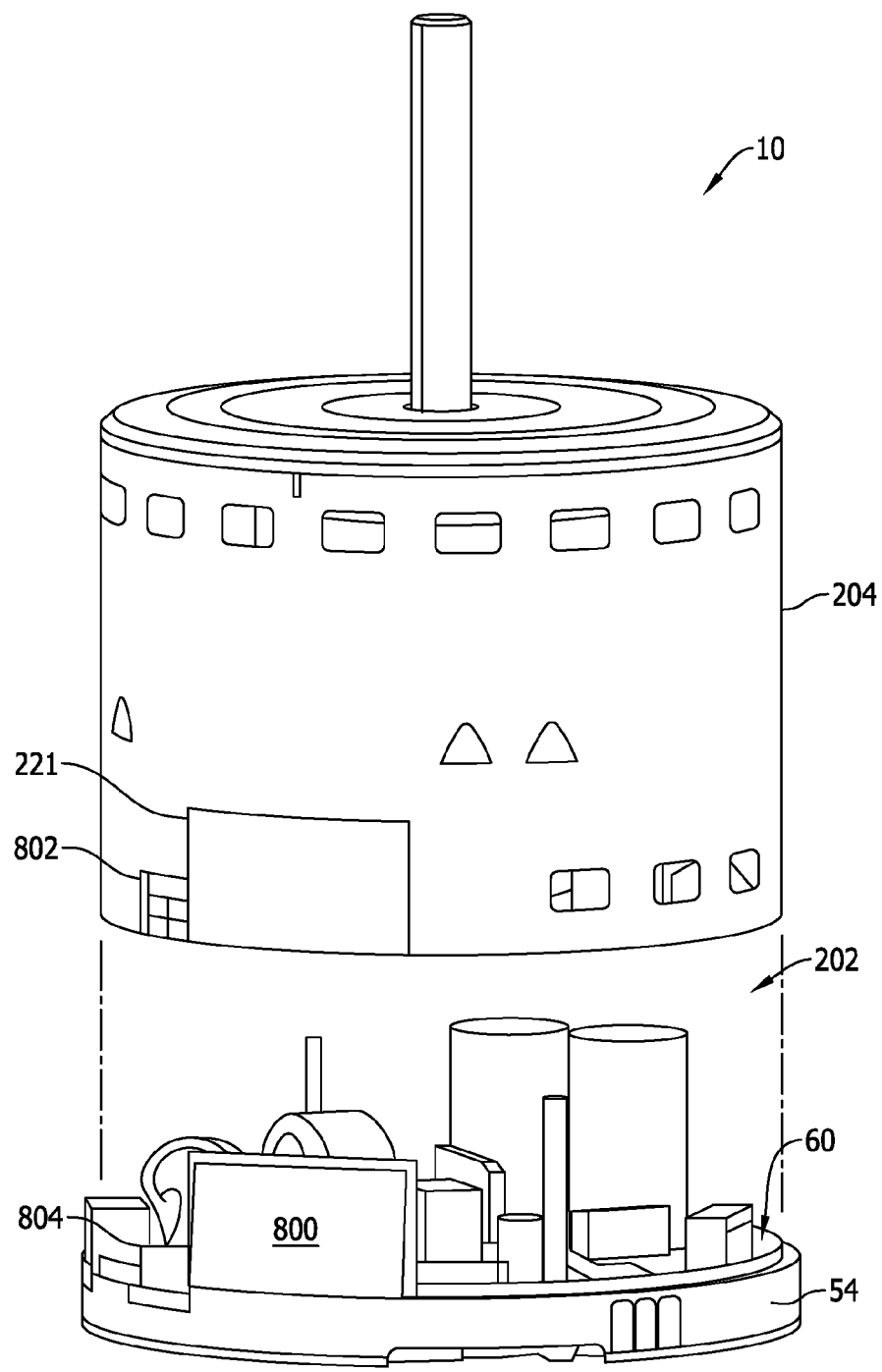
FIG. 8 is an exploded partial view of the electric motor shown in FIG. 1 including the casing and the electrical enclosure shown in FIG. 2.

FIG. 8 is an exploded partial view of motor 10 including casing 204 and motor control system 202 (shown in FIG. 2). In the exemplary embodiment, motor control system 202 includes electrical enclosure 54 (shown in FIG. 1), which houses PCB 60. Casing 204 includes opening 221 (shown in FIG. 2) defined therein for enabling NFC signals to pass through casing 204. In the exemplary embodiment, opening 221 is rectangular-shaped; however, opening 221 may have any shape that enables motor control system 202 to function as described herein. An antenna cover 800 is provided to cover opening 221 to protect components contained within casing 204. Antenna cover 800 is made substantially of nonconductive material, such as plastic and/or rubber, and is coupled to electrical enclosure 54 or PCB 60, and extends upward into opening 221 such that antenna cover 800 completely covers opening 221. Antenna 220 is coupled to PCB 60 adjacent to opening 221 such that antenna 220 is able to transmit and receive NFC signals.

In an alternative embodiment, casing 204 includes a second opening 802 for receiving a power connector 804 provided on electrical enclosure 54. Rather than providing opening 221 to enable communications with antenna 220, antenna 220 is wound around power connector 804 and is coupled to PCB 60.

Figure 9:
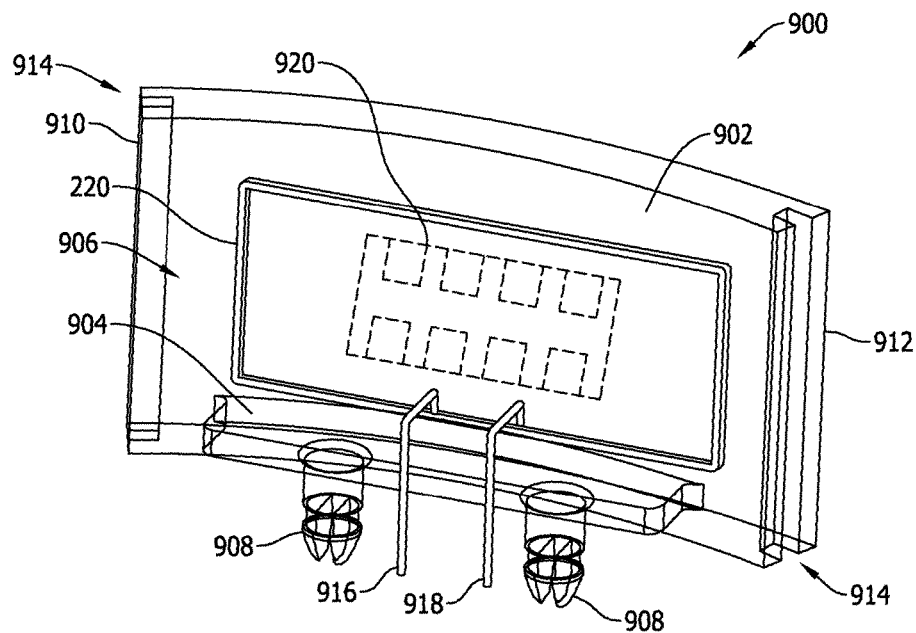
FIG. 9 is an enlarged perspective view of an exemplary antenna cover that may be used to fill the opening in one of the casing and the electrical enclosure shown in FIG. 2.

FIG. 9 is an enlarged perspective view of an exemplary antenna cover 900 that may be used to fill opening 221 in casing 204. In the exemplary embodiment, antenna cover 900 is made substantially of nonconductive material, such as plastic and/or rubber, and is molded around antenna 220 such that antenna cover 900 houses antenna 220.

Antenna cover 900 includes a substantially vertical body portion 902 configured to cover opening 221. Antenna cover 900 also includes a retention platform 904 coupled to an interior side surface 906 of vertical body portion 902. Retention platform 904 is substantially perpendicular relative to vertical body portion 902.

Antenna cover 900 further includes at least one retention snap 908 coupled to retention platform 904 and configured to be coupled to PCB 60 for securing antenna cover 900 within electric motor 10. More specifically at least one retention snap 908 extends from a bottom surface of retention platform 904 for coupling antenna cover 900 to PCB 60.

Vertical body portion 902 has a slightly convex, rounded shape corresponding to the shape of casing 204 and electrical enclosure 54. Vertical body portion 902 also includes first and second side faces 910 and 912 having slots 914 defined within first and second side surfaces that receive casing 204. Slots 914 are configured to engage with a portion of motor casing 204 or electronics enclosure 54 that is adjacent to opening 221 for securing antenna cover 900 within the electric motor assembly.

Antenna 220 is wound a predetermined number of times within antenna cover 900 and includes a first antenna line 916 and a second antenna line 918 for coupling to first and second lines 706 and 708 (shown in FIG. 7) of motor control system 202, respectively, to enable communication with memory device 244. In some embodiments, antenna cover 900 includes a power connector 920 for receiving power and/or control signals.

Figure 10:
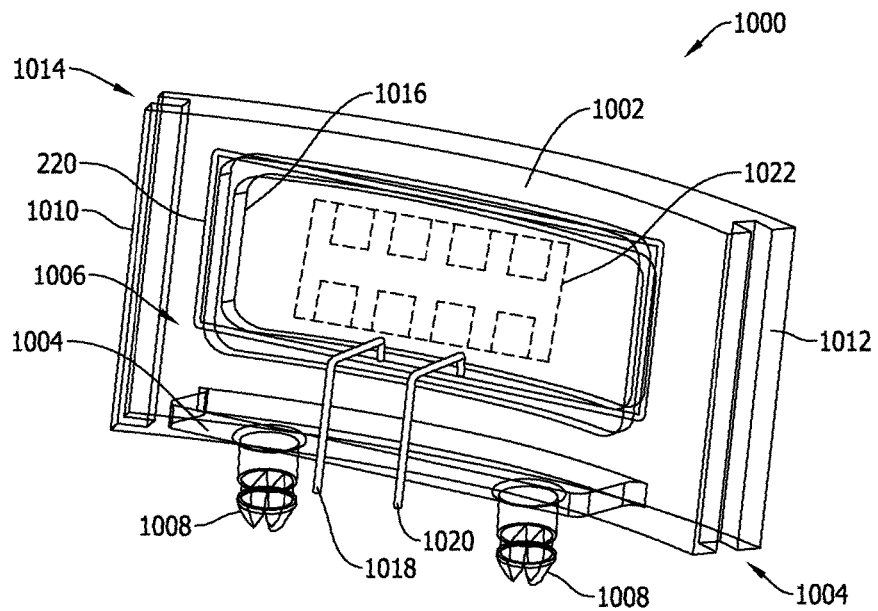
FIG. 10 is an enlarged perspective view of an exemplary antenna cover that may be used to fill the opening in one of the casing and the electrical enclosure shown in FIG. 2.

FIG. 10 is an enlarged perspective view of an exemplary antenna cover 1000 that may be used to fill opening 221 in casing 204 and/or electrical enclosure 54. In the exemplary embodiment, antenna cover 1000 is made substantially of nonconductive material, such as plastic and/or rubber, and houses antenna 220 therein.

Antenna cover 1000 includes a substantially vertical body portion 1002 configured to cover opening 221. Antenna cover 1000 also includes a retention platform 1004 coupled to an interior side surface 1006 of vertical body portion 1002. Retention platform 1004 is substantially perpendicular relative to vertical body portion 1002.

Antenna cover 1000 further includes at least one retention snap 1008 coupled to retention platform 1004 and configured to be coupled to PCB 60 for securing antenna cover 1000 within electric motor 10. More specifically at least one retention snap 1008 extends from a bottom surface of retention platform 1004 for coupling antenna cover 1000 to PCB 60.

Vertical body portion 1002 has a slightly convex, rounded shape corresponding to the shape of casing 204 and electrical enclosure 54. Vertical body portion 1002 also includes first and second side faces 1010 and 1012 having slots 1014 defined within first and second side surfaces that receive casing 204. Slots 1014 are configured to engage with a portion of motor casing 204 or electronics enclosure 54 that is adjacent to opening 221 for securing antenna cover 1000 within the electric motor assembly.

Antenna cover 1000 further includes a bobbin assembly coupled 1016 to interior-facing surface 1006. Bobbin assembly 1016 is configured to secure a looped wire portion of NFC antenna 220 adjacent to opening 221.

Antenna 220 is wound a predetermined number of times within antenna cover 1000 and includes a first antenna line 1018 and a second antenna line 1020 for coupling to first and second lines 706 and 708 (shown in FIG. 7) of motor control system 202, respectively, to enable communication with memory device 244. In some embodiments, antenna cover 1000 includes a power connector 1022 for receiving power and/or control signals.

Figure 11:
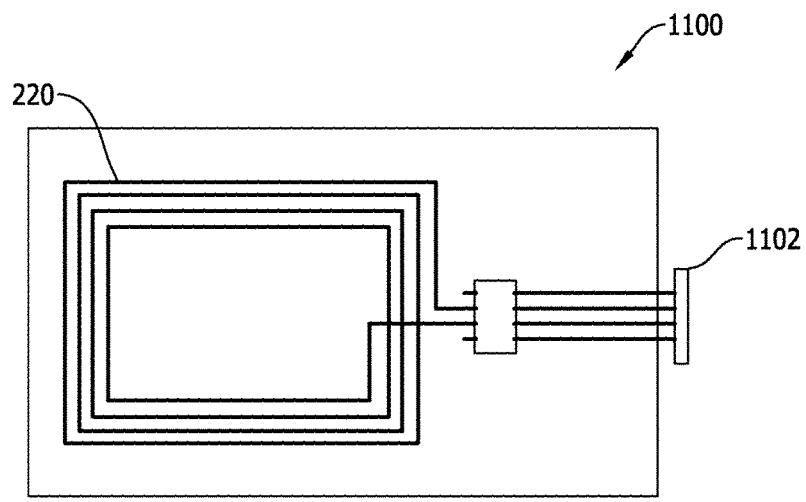
FIG. 11 is an enlarged perspective view of an exemplary antenna cover that may be used to fill the opening in one of the casing and the electrical enclosure shown in FIG. 2.

FIG. 11 is an enlarged perspective view of an exemplary antenna cover 1100 that may be used to fill opening 221 in casing 204 or electrical enclosure 54. In the exemplary embodiment, antenna cover 1100 is made substantially of nonconductive material, such as plastic and/or rubber, and houses antenna 220 therein. Antenna cover 1100 is configured to be secured to PCB 60. In one embodiment, antenna 220 is a rigid PCB antenna that is encapsulated within antenna cover 1100. In another embodiment, antenna 220 is a free-standing PCB covered by antenna cover 1100. Antenna 220 includes a surface mount technology (SMT) connector 1102 for coupling to PCB 60 using wire and solder terminals.

Figure 12:
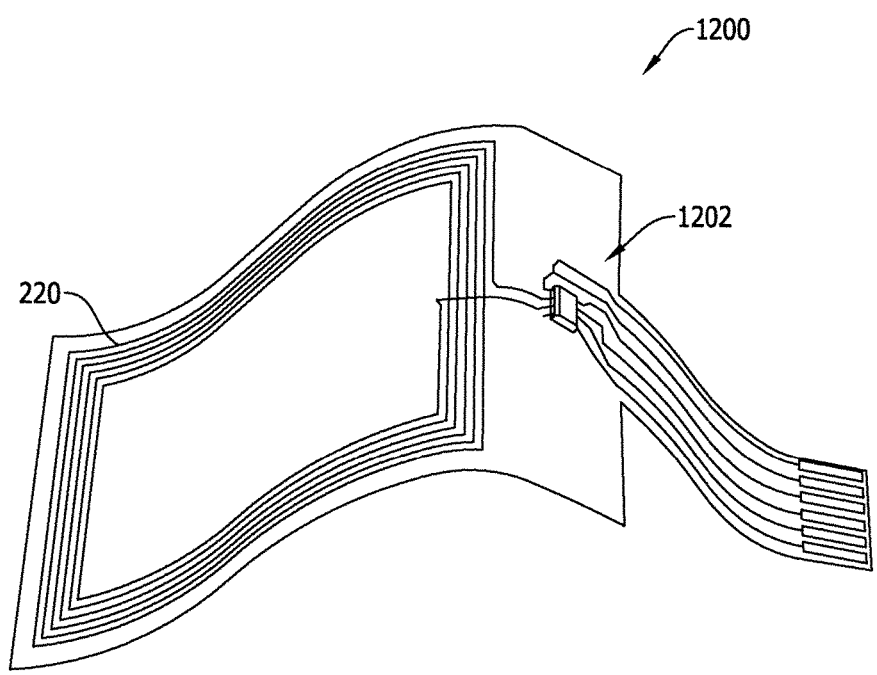
FIG. 12 is an enlarged perspective view of an exemplary antenna cover that may be used to fill the opening in one of the casing and the electrical enclosure shown in FIG. 2.

FIG. 12 is an enlarged perspective view of an exemplary antenna cover 1200 that may be used to fill opening 221 in casing 204 or electrical enclosure 54. In the exemplary embodiment, antenna cover 1200 is made substantially of nonconductive material, such as plastic and/or rubber, and houses antenna 220 therein. Antenna cover 1200 is configured to be secured to PCB 60. In one embodiment, antenna 220 is a flexible PCB antenna that is adhered to an inner surface of antenna cover 1200. In another embodiment, antenna 220 is a flexible PCB that is encapsulated between two portions (shown in FIG. 13) of antenna cover 1200. Antenna 220 includes pins 1202 on the flexible PCB for coupling to PCB 60 using wire and solder terminals.

Figure 13:
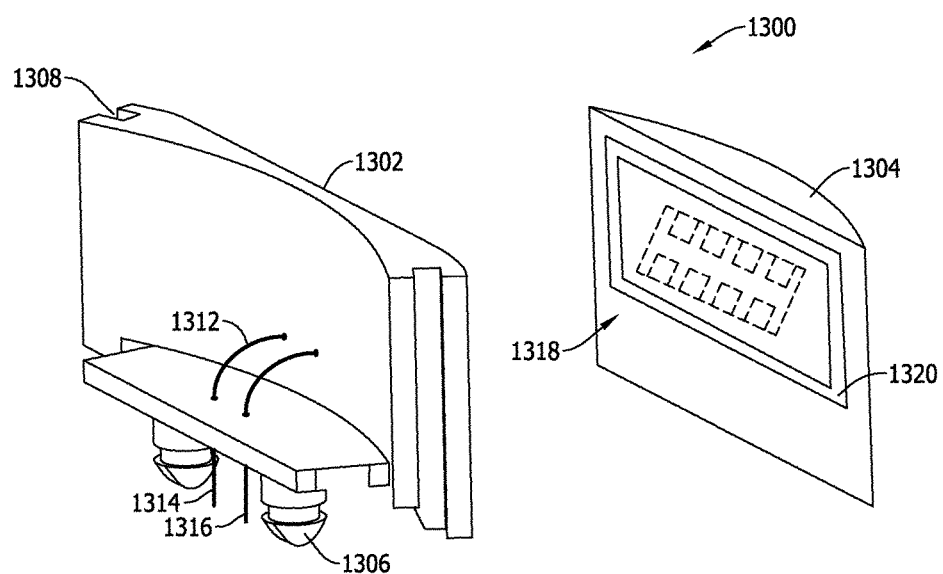
FIG. 13 is an enlarged perspective view of an exemplary encapsulation cover including a first antenna cover portion and a second antenna cover portion that may be molded around or encapsulate the NFC antenna.
Figure 14:
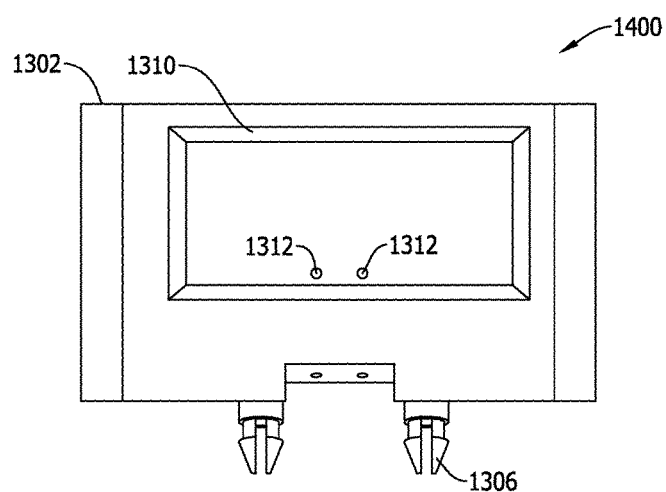
FIG. 14 is an enlarged front view of the first antenna cover portion shown in FIG. 13.

FIG. 13 is an enlarged perspective view of an exemplary encapsulation antenna cover 1300 including a first antenna cover portion 1302 and a second antenna cover portion 1304 that may be molded around or encapsulate antenna 220. FIG. 14 is an enlarged front view 1400 of first antenna cover portion 1302 (shown in FIG. 13). Encapsulation antenna cover 1300 is made substantially of nonconductive material, such as plastic and/or rubber.

In the exemplary embodiment, first antenna cover portion 1302 includes retention snaps 1306 extending from a bottom surface for first antenna cover portion 1302 to PCB 60. First antenna cover portion 1302 has a slightly round shape corresponding to the shape of casing 204 and includes slots 1308 defined within first and second side surfaces that receive casing 204 for securing first antenna cover portion 1302 within casing 204. Looking at the front view 1400, first antenna cover portion 1302 includes an antenna cavity 1310 defined therein for receiving antenna 220. First antenna cover portion 1302 also includes two holes 1312 defined therethrough for running first and second antenna lines 1314 and 1316 to PCB 60.

Second antenna cover portion 1304 includes an inner side 1318 that includes an antenna cavity 1320 defined therein for receiving antenna 220. Antenna 220 is wound a predetermined number of times within antenna cover 1300 and is coupled to first and second lines 706 and 708 (shown in FIG. 7) of motor control system 202, respectively. After antenna 220 is wound onto first antenna cover portion 1302, second antenna cover portion 1304 is molded to first antenna cover portion 1302.

Figure 15:
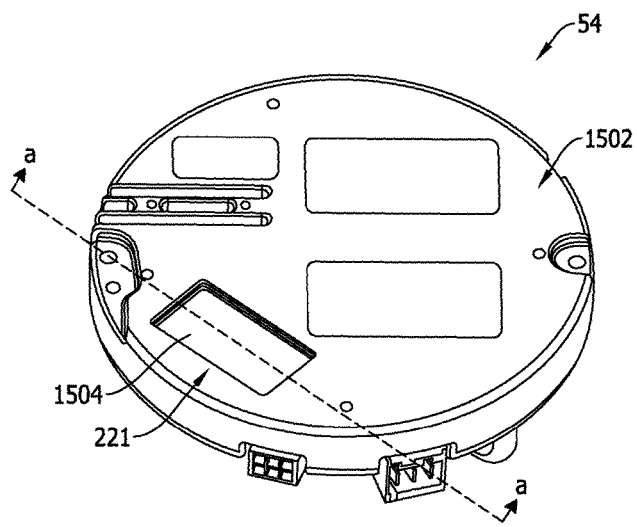
FIG. 15 is an enlarged bottom perspective view of the electrical enclosure shown in FIG. 1 housing the PCB.

FIG. 15 is an enlarged bottom perspective view of an exemplary electrical enclosure 54 (shown in FIG. 1), which houses PCB 60. In the exemplary embodiment, opening 1502 (shown in FIG. 2) is defined through a bottom portion 1502 of electrical enclosure 54 for enabling NFC signals to pass through. In the exemplary embodiment, opening 221 is rectangular-shaped; however, opening 221 may have any shape that enables motor control system 202 to function as described herein. An antenna cover 1504 is provided to cover opening 221 to protect components contained within electrical enclosure 54. Antenna cover 1504 is made substantially of nonconductive material, such as plastic and/or rubber, and is coupled to electrical enclosure 54 or PCB 60, and completely covers opening 221. Antenna 220 is coupled to PCB 60 adjacent to opening 221 such that antenna 220 is able to transmit and receive NFC signals.

Figure 16:
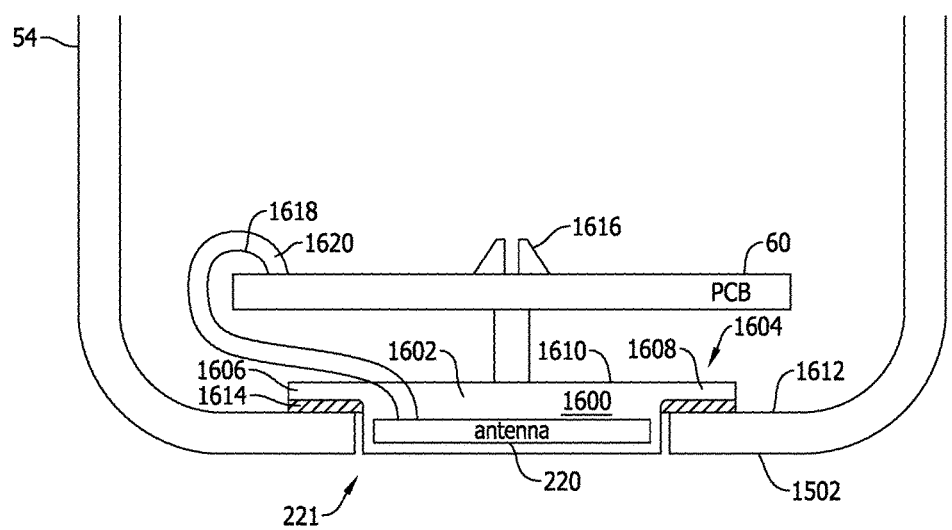
FIG. 16 is a cross-sectional view of electrical enclosure including an exemplary antenna cover for use in the bottom portion shown in FIG. 15 taken at line a-a.

FIG. 16 is a cross-sectional view of electrical enclosure 54 including an exemplary antenna cover 1600 for use in bottom portion 1502 (shown in FIG. 15) taken at line a-a. In the exemplary embodiment, antenna cover 1600 is made substantially of nonconductive material, such as plastic and/or rubber, and houses antenna 220 therein. That is, antenna 220 is wound into a coil and antenna cover 1600 is molded around antenna 220.

Antenna cover 1600 includes a substantially horizontal body portion 1602 configured to cover opening 221 and at least one retention device 1604 coupled to horizontal body portion 1602 and configured to secure antenna cover 1600 within electric motor 10.

More specifically, in the exemplary embodiment, retention device 1604 includes first and second flanges 1606 and 1608 extending radially outward from an upper side surface 1610 of horizontal body portion 1602 internal to electrical enclosure 54. First and second flanges 1606 and 1608 are configured to be seated against an interior surface 1612 of electrical enclosure 54 to prevent antenna cover 1600 from withdrawing from electrical enclosure 54.

In one embodiment, a gasket 1614 is positioned between first and second flanges 1606 and 1608 and interior surface 1612 of electrical enclosure 54. Gasket 1614 may be made of foam or any other suitable material.

Antenna cover 1600 also includes at least one retention snap 1616 coupled to upper side surface 1610 of horizontal body portion 1602. Retention snap 1616 is substantially perpendicular relative to horizontal body portion 1602 and is configured to be coupled to PCB 60.

First and second antenna lines 1618 and 1620 protrude from antenna cover 1600 and are configured to be coupled to first and second lines 706 and 708 (shown in FIG. 7) on PCB 60, respectively, to enable communication with memory device 244.

Figure 17:
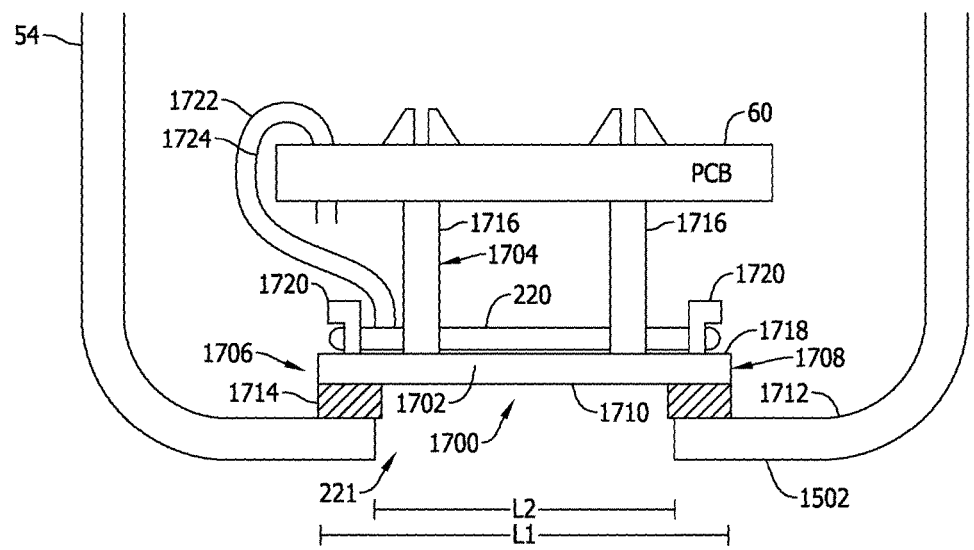
FIG. 17 is a cross-sectional view of electrical enclosure including an exemplary antenna cover for use in the bottom portion shown in FIG. 15 taken at line a-a.

FIG. 17 is a cross-sectional view of electrical enclosure 54 including an exemplary antenna cover 1700 for use in bottom portion 1502 (shown in FIG. 15) taken at line a-a. In the exemplary embodiment, antenna cover 1700 is made substantially of nonconductive material, such as plastic and/or rubber, and houses antenna 220 therein.

Antenna cover 1700 includes a substantially horizontal body portion 1702 configured to cover opening 221 and at least one retention device 1704 coupled to horizontal body portion 1702 and configured to secure antenna cover 1700 within electric motor 10.

In the exemplary embodiment, a length L1 of horizontal body portion 1702 is greater than a length L2 of opening 221. Horizontal body portion 1702 includes a first end 1706 and a second end 1708. An exterior side surface 1710 of first and second ends 1706 and 1708 is configured to be seated against an interior surface 1712 of electrical enclosure 54 to prevent antenna cover 1700 from withdrawing from electrical enclosure 54.

In one embodiment, a gasket 1714 is positioned between first and second ends 1706 and 1708 and interior surface 1712 of electrical enclosure 54. Gasket 1714 may be made of foam or any other suitable material.

Antenna cover 1700 also includes at least one retention snap 1716 coupled to an upper side surface 1718 of horizontal body portion 1702. Retention snap 1716 is substantially perpendicular relative to horizontal body portion 1702 and is configured to be coupled to PCB 60.

Antenna cover 1700 further includes a bobbin assembly 1720 protruding from an upper side surface 1718 of horizontal body portion 1702. Bobbin assembly 1720 is configured to secure a looped wire portion of NFC antenna 220 to antenna cover 1700. That is, antenna 220 is wound into a coil around bobbin assembly 1720 for a predetermined number of turns and antenna cover 1700 is molded around antenna 220. First and second antenna lines 1722 and 1724 protrude from bobbin assembly 1720 and are configured to be coupled to first and second lines 706 and 708 (shown in FIG. 7) on PCB 60, respectively, for enabling communication with memory device 244.

Figure 18:
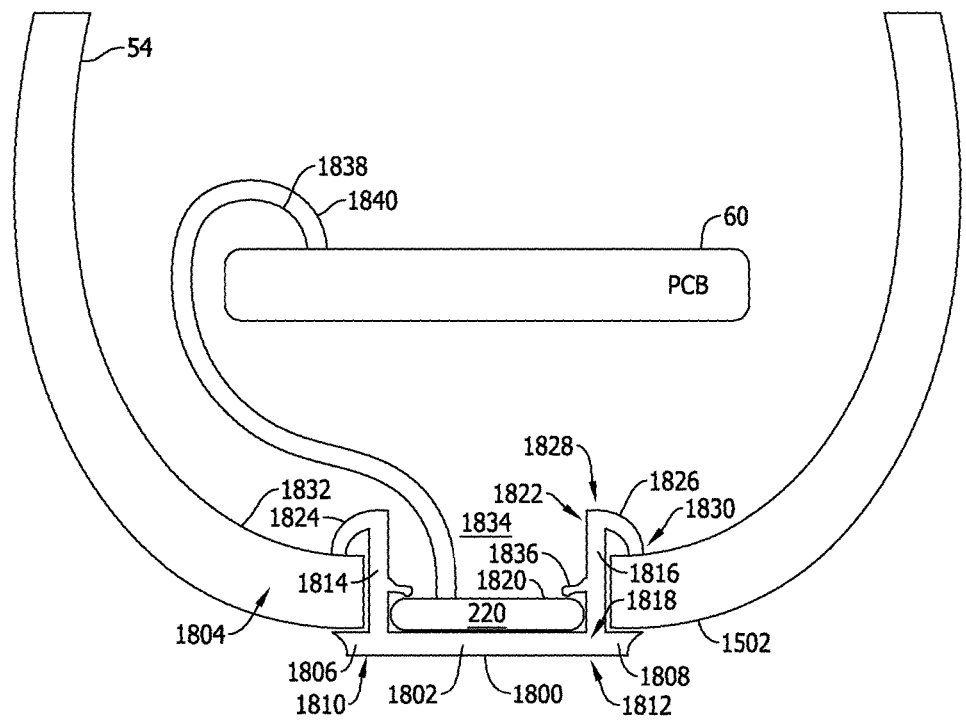
FIG. 18 is a cross-sectional view of the electrical enclosure including an exemplary antenna cover for use in the bottom portion shown in FIG. 15 taken at line a-a.

FIG. 18 is a cross-sectional view of electrical enclosure 54 including an exemplary antenna cover 1800 for use in bottom portion 1502 (shown in FIG. 15) taken at line a-a. In the exemplary embodiment, antenna cover 1800 is made substantially of nonconductive material, such as plastic and/or rubber, and houses antenna 220 therein.

Antenna cover 1800 includes a substantially horizontal body portion 1802 configured to cover opening 221 and at least one retention device 1804 coupled to horizontal body portion 1802 and configured to secure antenna cover 1800 within electric motor 10.

More specifically, in the exemplary embodiment, retention device 1804 includes first and second flanges 1806 and 1808 extending radially outward from respective first and second ends 1810 and 1812 of horizontal body portion 1802. First and second flanges 1806 and 1808 are configured to be seated against exterior bottom surface 1502 of electrical enclosure 54.

Retention device 1804 also includes first and second arms 1814 and 1816. Each arm 1814 and 1816 includes a first end 1818 protruding vertically from an interior side surface 1820 of horizontal body portion 1802 and a second end 1822 opposite from first end 1818.

Retention device 1804 further includes first and second legs 1824 and 1826. Each leg 1824 and 1826 includes a first end 1828 coupled to a respective second end 1822 of said first and second arms 1814 and 1816, and a second end 1830 configured to be seated against an interior side surface 1832 of electrical enclosure 54.

In the exemplary embodiment, horizontal body portion 1802 and first and second arms 1814 and 1816 define a generally U-shaped void 1834 internal to electrical enclosure 54 and configured to house NFC antenna 220 therein. More specifically, each of first and second arms 1814 and 1816 includes an antenna flange 1836 extending into U-shaped void 1834 for securing NFC antenna 220.

Antenna 220 includes first and second antenna lines 1838 and 1840 protruding therefrom, which are configured to be coupled to first and second lines 706 and 708 (shown in FIG. 7) on PCB 60, respectively, for enabling communication with memory device 244. In one embodiment, antenna 220 is a rigid PCB antenna having a PCB pattern coil. In another embodiment, antenna 220 is a flexible PCB antenna having a PCB pattern coil. Where antenna 220 is the flexible PCB antenna, a stiffener may be coupled to antenna 220 for structural support.

Figure 19:
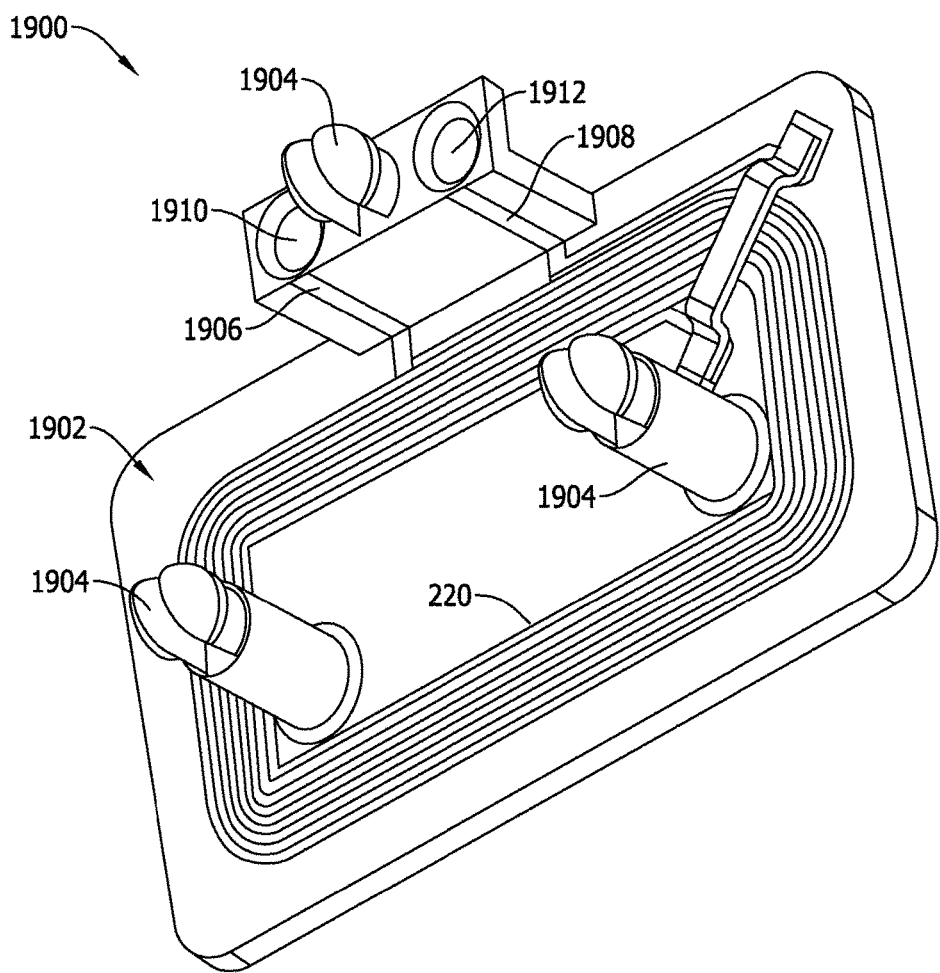
FIG. 19 is an enlarged perspective view of an exemplary antenna cover that may be used to fill an opening defined in the bottom portion shown in FIG. 15 of the electrical enclosure.

FIG. 19 is an enlarged perspective view of an exemplary antenna cover 1900 that may be used to fill opening 221 in bottom portion 1502 (shown in FIG. 15) of electrical enclosure 54. In the exemplary embodiment, antenna cover 1900 is made substantially of nonconductive material, such as plastic and/or rubber, and houses antenna 220 therein. Antenna cover 1900 includes an inward facing surface 1902 facing an inward portion of electronics enclosure 54 and retention snaps 1904 extending from inward side 1902 for securing antenna cover 1900 to PCB 60. Antenna cover 1900 has a flat shape corresponding to the shape of bottom portion 1502 (shown in FIG. 15) of electrical enclosure 54.

In the exemplary embodiment, antenna 220 is laser printed onto antenna cover 1900 using laser direct structuring (LDS) technology. Antenna 220 is wound a predetermined number of times and further includes a first antenna line 1906 and a second antenna line 1908 for coupling to first and second lines 706 and 708 (shown in FIG. 7) of motor control system 202, respectively. More specifically, in the exemplary embodiment, first antenna line 1906 is coupled to PCB 60 by a first connector 1910 and second antenna line 1908 is coupled to PCB 60 by a second connector 1912. First and second connectors 1910 and 1912 provide a conductive and adhesive interconnection between first antenna line 1906 and first connector 1910, and second antenna line 1908 and second connector 1912, respectively.

Figure 20:
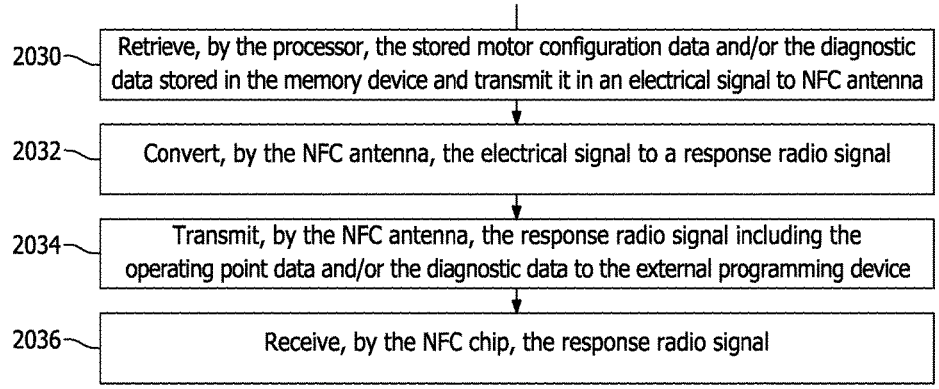
FIG. 20 is a flow chart of an exemplary method of communicating with an electric motor using the NFC antenna shown in FIGS. 2 and 7-19.

FIG. 20 is a flow chart of an exemplary method 2000 of communicating with electric motor 10 using NFC antenna 220.

In the exemplary embodiment, user 325 (shown in FIG. 3), using user input interface 335 (shown in FIG. 3) of external programming device 250 (shown in FIGS. 2-6), selects 2002 a write motor mode for providing updated motor configuration data to motor 10. Processor 315 (shown in FIG. 3) of external programming device 250 displays 2004 a plurality of operating point selection tools 404 (shown in FIG. 4) to user 325 via presentation interface 320 (shown in FIG. 3) of external programming device 250. Each operating point selection tool 404 of the plurality of operating point selection tools 404 is associated with a respective power input tap 222-230 (shown in FIG. 2) of a plurality of power input taps 214 (shown in FIG. 2) of electric motor 10. For a power input tap, operating point selection tool 404 enables user 325 to select a percentage at which to operate electric motor 10 from a range of pre-defined operating points.

User 325, using user input interface 335, selects 2006 an operating point of a motor configuration parameter for at least one power input tap 222-230. The motor configuration parameter may be a regulation mode with a constant torque, speed, or airflow, a demand, a direction of rotation, or an OFF delay.

After inputting the desired operating points (referred to as "updated motor configuration data"), user 325 positions 2008 external programming device 250 adjacent to electric motor 10 to initiate communication of an updated motor configuration data signal to electric motor 10. In the exemplary embodiment, external programming device 250 should be positioned 10 centimeters or less from antenna 220. Alternatively, external programming device 250 may be positioned any distance from antenna 220 that enables NFC communication as described herein.

Processor 315 communicates 2010 the updated motor configuration data signal to communication interface 340 (shown in FIG. 3) of external programming device 250. Communication interface 340 includes an NFC chip 345 and a signal converter 350. Signal converter 350 converts 2012 the updated motor configuration data signal to a radio signal, and NFC chip 345 transmits 2014 the radio signal to antenna 220.

Antenna 220 receives 2016 the radio signal, which includes the updated motor configuration data from NFC chip 345. In the exemplary embodiment, casing 204 and electronics enclosure 54 are made of metal, which may cause interference and/or weaken NFC radio signals being transmitted to and from devices external to motor 10. Accordingly, an opening 221 is defined in casing 204 and/or electronics enclosure 54 to enable radio signals to reach the interior portion of casing 204 and electronics enclosure 54. An antenna cover (e.g., any antenna cover described in FIGS. 8-19) formed from plastic, rubber, or the like is coupled within opening 221 to protect internal motor components, while enabling radio signals to travel therethrough. Depending on the particular antenna cover selected for use, antenna 220 may be coupled to, molded within, adhered to, secured by, and or wound around at least a portion of the antenna cover. Antenna 220 includes first and second antenna lines that are coupled to memory device 244. Additionally, antenna 220 is coupled adjacent to opening 221 on an interior portion of casing 204 or electronics enclosure 54.

Antenna 220 converts 2018 the received radio signal to an electrical signal, which is transmitted to memory device 244. The updated motor configuration data includes the updated operating points for one or more power input taps 214. Memory device 244 stores 2020 the updated operating point values for each respective power input tap 222-230. Thereafter, when a power input tap 214 is energized by a system controller of an application in which electric motor 10 is operating, microcontroller 246 retrieves the stored operating point value associated with the energized tap and controls switch driver 210 in accordance with the operating point to drive motor 10.

In the exemplary embodiment, user 325 may select 2022 a read motor mode for obtaining stored operating points for each tap 222-230 and diagnostic data for motor 10. User 325 positions 2024 external programming device 250 adjacent to electric motor 10 to initiate a reading of the stored motor configuration data and/or the diagnostic data. NFC chip 345 transmits 2026 a radio signal for interrogating memory device 244.

Antenna 220 receives 2028 the radio signal including data and power for powering memory device 244. Processor 246 has stored its information into memory device 244. External programming device 250 then reads this information from memory device 244. The reading of information from memory device 244 may occur regardless of whether or not processor 246 is in a powered-up state or is in a powered-off state. The radio signal is modulated by memory device 244, and external programming device 250 reads this information via NFC antenna 220.

NFC chip 345 receives 2036 the response radio signal. Signal converter 350 converts the response radio signal to an electrical signal for transmission to processor 315. Processor 315 displays the stored motor configuration data and/or the diagnostic data to user 325 via presentation interface 320. In some embodiments, processor 315 also stores the motor configuration data and/or the diagnostic data in memory device 310.

Figure 21:
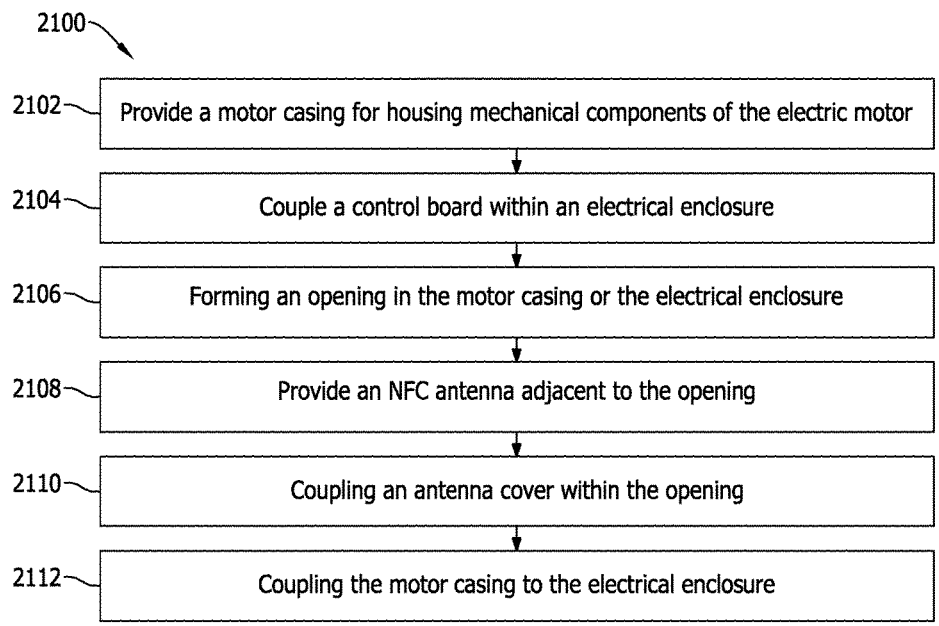
FIG. 21 is a flow chart of an exemplary method of communicating with an electric motor using an NFC antenna.

FIG. 21 is a flow chart of an exemplary method 2100 of communicating with electric motor 10 using NFC antenna 220.

In the exemplary embodiment, the method includes providing 2102 motor casing 204 for housing mechanical components of electric motor 10. Control board 60 is provided and is coupled 2104 within electrical enclosure 54. Control board 60 includes microcontroller 246 and memory device 244.

The method also includes forming 2106 opening 221 in one of motor casing 204 and electrical enclosure 54. In one embodiment, forming opening 221 includes forming opening 221 in a side surface of one of motor casing 204 and electrical enclosure 54. In another embodiment, forming opening 221 includes forming opening 221 in a bottom surface of electrical enclosure 54.

NFC antenna 220 is provided 2108 adjacent to opening 221. NFC antenna 220 is in communication with memory device 244. In one embodiment, providing NFC antenna 220 includes providing a looped wire, coupling a first antenna line and a second antenna line to the looped wire, and coupling the first and second antenna lines to the control board using an I2C connection.

The method further includes coupling 2110 an antenna cover (shown in FIGS. 8-19) within opening 221. The antenna cover is manufactured using a nonconductive material that enables NFC communication therethrough. Where opening 221 is formed in a side surface of one of motor casing 204 and electrical enclosure 54, coupling the antenna cover includes providing a substantially vertical body portion, coupling a retention platform to an interior side surface of the vertical body portion, the retention platform substantially perpendicular to the vertical body portion, and coupling at least one retention snap coupled to the retention platform, the at least one retention snap configured to be coupled to the control board for securing the antenna cover within the electric motor. Additionally, or alternatively, coupling the antenna cover within opening 221 includes coupling a bobbin assembly to an interior side surface of the antenna cover. The bobbin assembly is configured to secure a looped wire portion of NFC antenna 220 adjacent to opening 221.

Alternatively, where opening 221 is formed in a bottom surface of electrical enclosure 54, coupling the antenna cover includes providing a substantially horizontal body portion configured to cover the opening, and coupling at least one retention device to the horizontal body portion that is configured to secure the antenna cover within the electric motor.

In some embodiments, the method includes coupling NFC antenna 220 to the antenna cover by either encapsulating NFC antenna 220 within the antenna cover or adhering NFC antenna 220 to an interior surface of the antenna cover.

Finally, the method includes coupling 2112 motor casing 204 to electrical enclosure 54.

Described herein are systems and methods for communicating with an electric motor through an NFC antenna. The electric motor includes a motor casing having an opening for enabling NFC signals to pass therethrough, and an NFC antenna mounted internally within the motor casing for transmitting and/or receiving NFC radio signals to or from external devices. An antenna cover is provided within the opening to protect components inside the electric motor, while still enabling NFC signals to be transmitted through the motor casing. Additionally, by positioning the NFC antenna and substantially all of the antenna cover within the interior of the casing, an exterior size and profile of the electric motor is not affected.

Some embodiments described herein relate to electric motors including electric motors and electronic controls. However, the methods and apparatus are not limited to the specific embodiments described herein, but rather, components of apparatus and/or steps of the methods may be utilized independently and separately from other components and/or steps described herein. For example, the methods may also be used in combination with any motor, and are not limited to practice with the electric motors as described herein. In addition, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

What is claimed is:

1. An electric motor assembly comprising:
   an electric motor;
   a motor casing configured to house said electric motor;
   an electronics enclosure coupled to said motor casing and configured to house a control board including a microcontroller and a memory device therein, said microcontroller configured to control said electric motor based at least in part on motor configuration data stored in said memory device;
   a near field communications (NFC) antenna positioned adjacent an opening defined in one of said motor casing and said electronics enclosure, said NFC antenna communicatively coupled to said memory device, said NFC antenna configured to:
      receive a radio signal transmitted by an external programming device, the radio signal including updated motor configuration data;
      convert the radio signal to an electrical signal, the electrical signal including the updated motor configuration data; and
      transmit the electrical signal to the memory device to store the updated motor configuration data; and
   an antenna cover positioned to cover the opening.

2. The electric motor assembly of claim 1, wherein said NFC antenna is positioned within an interior portion of one of said motor casing and said electronics enclosure.

3. The electric motor assembly of claim 1, wherein said NFC antenna comprises:
   a looped wire; and
   a first antenna line and a second antenna line coupled to and extending from said looped wire, said first and second antenna lines configured to communicatively couple said NFC antenna to said memory device.

4. The electric motor assembly of claim 1, wherein the opening is defined in a side wall of one of said motor casing and said electronics enclosure, said antenna cover comprising:
   a substantially vertical body portion configured to cover the opening;
   a retention platform coupled to an interior side surface of said vertical body portion, said retention platform substantially perpendicular to said vertical body portion; and
   at least one retention snap coupled to said retention platform, said at least one retention snap configured to be coupled to said control board for securing said antenna cover within said electric motor assembly.

5. The electric motor assembly of claim 4, wherein said antenna cover further comprises a slot formed in each of a first side face and a second side face of said antenna cover, said slot configured to engage with a portion of said one of said motor casing and said electronics enclosure that is adjacent the opening for said securing antenna cover within said electric motor assembly.

6. The electric motor assembly of claim 4, wherein said antenna cover further comprises:
   a first antenna cover portion;
   a second antenna cover portion configured to be coupled to said first antenna cover portion; and
   an antenna cavity defined between said first and second antenna cover portions for encapsulating said NFC antenna therein.

7. The electric motor assembly of claim 4, wherein said antenna cover further comprises a bobbin assembly coupled to an interior-facing surface of said antenna cover, said bobbin assembly configured to secure a looped wire portion of said NFC antenna adjacent to the opening.

8. The electric motor assembly of claim 4, wherein said NFC antenna comprises a rigid printed circuit board (PCB) antenna, wherein said rigid PCB antenna is secured within said motor assembly by one of encapsulation within said antenna cover and adherence to an interior surface of said antenna cover.

9. The electric motor assembly of claim 4, wherein said NFC antenna comprises a flexible PCB antenna, wherein said flexible PCB antenna is secured within said motor assembly by one of encapsulation within said antenna cover and adherence to an interior surface of said antenna cover.

10. The electric motor assembly of claim 1, further comprising a power connector at least partially extruding from a second opening defined in one of said motor casing and said electronics enclosure, wherein said NFC antenna is coupled to an interior surface of said one of said motor casing and said electronics enclosure adjacent to the second opening.

11. The electric motor assembly of claim 1, wherein the opening is defined through a bottom surface of said electronics enclosure, said antenna cover comprising:
   a substantially horizontal body portion configured to cover the opening; and
   at least one retention device coupled to said horizontal body portion and configured to secure said antenna cover within said electric motor assembly.

12. The electric motor assembly of claim 11, wherein said at least one retention device comprises first and second flanges extending radially outward from an upper side surface of said horizontal body portion internal to said electrical enclosure, said first and second flanges configured to be seated against an interior surface of said electrical enclosure to prevent said antenna cover from withdrawing from said electrical enclosure.

13. The electric motor assembly of claim 11, wherein said at least one retention device comprises at least one retention snap coupled to an interior side surface of said horizontal body portion, said at least one retention snap substantially perpendicular to said horizontal body portion and configured to be coupled to said control board.

14. The electric motor assembly of claim 11, wherein a length of said horizontal body portion is greater than a length of the opening, said horizontal body portion comprising:
   a first end and a second end, wherein an exterior side surface of said first and second ends is configured to be seated against an interior surface of said electrical enclosure to prevent said antenna cover from withdrawing from said electrical enclosure; and
   a bobbin assembly protruding from an interior side surface of said horizontal body portion and configured to secure a looped wire portion of said NFC antenna.

15. The electric motor assembly of claim 11, wherein said at least one retention device comprises:
   first and second flanges extending radially outward from respective first and second ends of said horizontal body portion, said first and second flanges configured to be seated against an exterior bottom surface of said electrical enclosure;
   first and second arms, each arm comprising a first end protruding vertically from an interior side surface of said horizontal body portion and a second end; and
   first and second legs, each leg comprising a first end coupled to a respective second end of said first and second arms, and second end of first and second arms, respectively, said each leg configured to be seated against an exterior bottom surface of said electrical enclosure;
   wherein said horizontal body portion and said first and second arms define a generally U-shaped void internal to said electrical enclosure and configured to house said NFC antenna therein.

16. The electric motor assembly of claim 15, wherein each of said first and second arms comprises an antenna flange extending into the U-shaped void for securing said NFC antenna.

17. The electric motor assembly of claim 15, wherein said NFC antenna comprises one of a rigid and a flexible PCB antenna that includes first and second antenna lines for coupling to said control board to enable communication between said NFC antenna and said memory device.

18. The electric motor assembly of claim 17, wherein said horizontal body portion comprises:
   said NFC antenna comprising first and second antenna lines for coupling to said memory device on said control board, said NFC antenna laser printed on an interior side surface of said horizontal body portion using laser direct structuring; and
   an antenna platform coupled to the interior side surface of said horizontal body portion, said retention platform substantially perpendicular to said horizontal body portion, said antenna platform comprising first and second antenna connectors coupled to respective first and second antenna lines and configured to provide a conductive and adhesive interconnection to said memory device.

19. The electric motor assembly of claim 1, wherein the motor configuration data includes a plurality of operating points for the electric motor, each operating point associated with a respective power input tap of a plurality of power input taps of said electric motor.

20. The electric motor assembly of claim 19, wherein, during operation of said electric motor, said microcontroller is configured to:
   determine which said respective power input tap has been energized by a system controller;
   retrieve the operating point associated with the energized power input tap; and
   generate one or more control signals for controlling power switches to drive said electric motor in accordance with the retrieved operating point.

21. The electric motor assembly of claim 1, wherein upon receiving a read motor radio signal from the external programming device, said electric motor assembly is configured to:
   retrieve, by said microprocessor, at least one of stored motor configuration data and diagnostic data stored in said memory device;
   transmit, by said microprocessor, a read motor response electrical signal to said NFC antenna, the read motor response electrical signal including the at least one of stored motor configuration data and diagnostic data;
   convert, by said NFC antenna, the read motor response electrical signal to a read motor response radio signal; and
   transmit, by said NFC antenna, the read motor response radio signal to the external programming device.

22. A method of manufacturing an electric motor, said method comprising:
   providing a motor casing for housing mechanical components of the electric motor;
   coupling a control board within an electrical enclosure, the control board including a microcontroller and a memory device;
   forming an opening in one of the motor casing and the electrical enclosure;
   providing an NFC antenna adjacent to the opening, the NFC antenna in communication with the memory device;
   coupling an antenna cover within the opening, the antenna cover manufactured using a nonconductive material that enables NFC communication therethrough, and coupling the motor casing to the electrical enclosure.

23. The method of claim 22, further comprising coupling the NFC antenna to the antenna cover by one of encapsulating the NFC antenna within the antenna cover and adhering the NFC antenna to an interior surface of the antenna cover.

24. The method of claim 22, wherein forming the opening comprises forming the opening in a side surface of one of the motor casing and the electrical enclosure.

25. The method of claim 24, wherein coupling the antenna cover within the opening comprises:
   providing a substantially vertical body portion;
   coupling a retention platform to an interior side surface of the vertical body portion, the retention platform substantially perpendicular to the vertical body portion; and
   coupling at least one retention snap coupled to the retention platform, the at least one retention snap configured to be coupled to the control board for securing the antenna cover within the electric motor.

26. The method of claim 24, wherein coupling the antenna cover within the opening comprises coupling a bobbin assembly to an interior-facing surface of the antenna cover, the bobbin assembly configured to secure a looped wire portion of the NFC antenna adjacent to the opening.

27. The method of claim 22, wherein forming the opening comprises forming the opening in a bottom surface of the electrical enclosure.

28. The method of claim 27, wherein coupling the antenna cover within the opening comprises:
   providing a substantially horizontal body portion configured to cover the opening; and
   coupling at least one retention device to the horizontal body portion and configured to secure the antenna cover within the electric motor.

29. The method of claim 22, wherein providing the NFC antenna comprises:
   providing a looped wire;
   coupling a first antenna line and a second antenna line to the looped wire; and
   coupling the first and second antenna lines to the control board using an I2C connection.

30. A method of communicating between an electric motor and an external programming device using near field communications (NFC), the electric motor including a motor casing configured to house the electric motor, and an electronics enclosure coupled to the motor casing and configured to house a control board that includes a microcontroller and a memory device, said method comprising:
   receiving, by an NFC antenna coupled to an interior of the electric motor, a radio signal transmitted by the external programming device, the radio signal including updated motor configuration data, the NFC antenna positioned adjacent to an opening defined in one of the motor casing and the electronics enclosure, wherein the one of the motor casing and the electronics enclosure includes an antenna cover positioned to cover the opening, the NFC antenna communicatively coupled to the memory device;
   converting, by the NFC antenna, the radio signal to an electrical signal, the electrical signal including the updated motor configuration data;
   transmitting, by the NFC antenna, the electrical signal to the memory device; and
   storing, by the memory device, the updated motor configuration data based on the electrical signal received from the NFC antenna.

31. An electric motor communication system comprising:
   an electric motor comprising:
      a motor casing configured to house said electric motor;
      an electronics enclosure coupled to said motor casing and configured to house a control board including a microcontroller and a memory device therein, said microcontroller configured to control said electric motor based at least in part on motor configuration data stored in said memory device;
      a near field communications (NFC) antenna positioned adjacent to an opening defined in one of said motor casing and said electronics enclosure, said NFC antenna communicatively coupled to said memory device, and
      an antenna cover positioned to cover the opening; and
   an external programming device comprising a processor, a memory device, and an NFC chip configured to transmit a radio signal to said NFC antenna.

32. The electric motor communication system of claim 31, wherein said external programming device a presentation interface and a user input interface, wherein said processor is configured to:

display a plurality of operating point selection tools to the user via said presentation interface, each operating point selection tool associated with a respective power input tap of a plurality of power input taps of the electric motor;
receive updated motor configuration data from the user using said user input interface, the motor configuration data including at least one operating point value associated with at least one power input tap;
determine communication has been initiated with said NFC antenna of said electric motor;
convert, using a signal converter, the received updated motor configuration data to a radio signal; and
transmit, by said NFC chip, the radio signal to said NFC antenna.

* * * * *